US009588619B2

(12) United States Patent
Christiansson et al.

(10) Patent No.: US 9,588,619 B2
(45) Date of Patent: Mar. 7, 2017

(54) PERFORMANCE MONITORING AND CORRECTION IN A TOUCH-SENSITIVE APPARATUS

(71) Applicant: FlatFrog Laboratories AB, Lund (SE)

(72) Inventors: Tomas Christiansson, Torna-Hallestad (SE); Andreas Björklund, Lund (SE); Mats Petter Wallander, Lund (SE); Nicklas Ohlsson, Bunkeflostrand (SE)

(73) Assignee: FlatFrog Laboratories AB, Lund (SE)

( * ) Notice: Subject to any disclaimer, the term of this patent is extended or adjusted under 35 U.S.C. 154(b) by 79 days.

(21) Appl. No.: 14/369,475

(22) PCT Filed: Jan. 29, 2013

(86) PCT No.: PCT/SE2013/050064
§ 371 (c)(1),
(2) Date: Jun. 27, 2014

(87) PCT Pub. No.: WO2013/115710
PCT Pub. Date: Aug. 8, 2013

(65) Prior Publication Data
US 2014/0368471 A1 Dec. 18, 2014

Related U.S. Application Data

(60) Provisional application No. 61/592,641, filed on Jan. 31, 2012.

(30) Foreign Application Priority Data

Jan. 31, 2012 (SE) ..................................... 1250064

(51) Int. Cl.
G06F 3/041 (2006.01)
G06F 3/042 (2006.01)

(52) U.S. Cl.
CPC ............ *G06F 3/0418* (2013.01); *G06F 3/042* (2013.01); *G06F 3/0428* (2013.01); *G06F 2203/04109* (2013.01)

(58) Field of Classification Search
CPC ......... A61B 5/055; A61B 8/0808; A61B 5/16; A61B 5/743; G06T 7/0012;
(Continued)

(56) References Cited

U.S. PATENT DOCUMENTS 4,752,655 A * 6/1988 Tajiri ..................... G06F 3/045
178/18.05
6,972,753 B1 12/2005 Kimura et al.
(Continued)

FOREIGN PATENT DOCUMENTS

EP 1835464 A1 9/2007
WO WO-2009/048365 A1 4/2009
(Continued)

OTHER PUBLICATIONS

International Search Report and Written Opinion dated Sep. 12, 2013 issued in corresponding International Application No. PCT/SE2013/050064.
(Continued)

*Primary Examiner* — Kent Chang
*Assistant Examiner* — Sujit Shah
(74) *Attorney, Agent, or Firm* — Harness, Dickey & Pierce

(57) ABSTRACT

Touch sensitivity is enabled using a touch system that comprises a panel configured to conduct signals, e.g. by TIR, along detection lines across a touch surface. A signal processor operates in a sequence of repetitions to: generate data samples that represent detected signal energy on the actual detection lines; generate based on the data samples, an interpolated sinogram comprising interpolation samples that
(Continued)

represent fictitious detection lines which have a desired location on the touch surface; and reconstruct a signal interaction pattern for the touch surface based on the interpolated sinogram. The signal processor implements an error correction to counteract the influence of a change in validity status for a data sample among the data samples, by identifying interpolation samples affected by the change in validity status, and by setting each identified interpolation sample to a value that maintains a relative signal transmission of the fictitious detection line from a former repetition.

21 Claims, 8 Drawing Sheets

(58) Field of Classification Search
CPC ....... G06T 2207/10072; G06T 2210/41; G06T 19/20; G06T 5/001; G06T 5/002
See application file for complete search history.

(56) References Cited

U.S. PATENT DOCUMENTS

| | | |
|---|---|---|
| 7,432,893 B2 | 10/2008 | Ma et al. |
| 8,094,910 B2 | 1/2012 | Xu et al. |
| 8,339,379 B2 | 12/2012 | Goertz et al. |
| 8,384,010 B2 | 2/2013 | Hong et al. |
| 8,445,834 B2 | 5/2013 | Hong et al. |
| 2004/0245438 A1 | 12/2004 | Payne et al. |
| 2006/0114237 A1 | 6/2006 | Crockett et al. |
| 2007/0075648 A1 | 4/2007 | Blythe et al. |
| 2009/0091554 A1 | 4/2009 | Keam |
| 2009/0153519 A1* | 6/2009 | Suarez Rovere ..... G06F 3/0421 345/173 |
| 2009/0189874 A1* | 7/2009 | Chene ..................... G06F 3/016 345/173 |
| 2009/0189878 A1* | 7/2009 | Goertz .................. G06F 3/0421 345/175 |
| 2009/0297009 A1 | 12/2009 | Xu et al. |
| 2010/0321328 A1* | 12/2010 | Chang ................... G06F 3/0416 345/174 |
| 2011/0068256 A1* | 3/2011 | Hong .................... G06F 3/0421 250/208.6 |
| 2011/0221997 A1 | 9/2011 | Kim et al. |
| 2011/0267296 A1* | 11/2011 | Noguchi ............... G06F 3/0412 345/173 |
| 2012/0162144 A1* | 6/2012 | Fahraeus ............... G06F 3/0418 345/178 |
| 2012/0256882 A1 | 10/2012 | Christiansson et al. |
| 2012/0305755 A1 | 12/2012 | Hong et al. |
| 2013/0044073 A1 | 2/2013 | Christiansson et al. |
| 2013/0076697 A1 | 3/2013 | Goertz et al. |
| 2013/0120320 A1 | 5/2013 | Liu et al. |
| 2013/0201142 A1 | 8/2013 | Suarez Rovere |
| 2014/0267124 A1 | 9/2014 | Christiansson et al. |
| 2014/0300572 A1 | 10/2014 | Ohlsson et al. |

FOREIGN PATENT DOCUMENTS

| | | |
|---|---|---|
| WO | WO-2009/077962 A2 | 6/2009 |
| WO | WO-2010/006882 A2 | 1/2010 |
| WO | WO-2010/006883 A2 | 1/2010 |
| WO | WO-2010/006884 A2 | 1/2010 |
| WO | WO-2010/006885 A2 | 1/2010 |
| WO | WO-2010/006886 A2 | 1/2010 |
| WO | WO-2010/064983 A2 | 6/2010 |
| WO | WO-2010/134865 A1 | 11/2010 |
| WO | WO-2011/028169 A1 | 3/2011 |
| WO | WO-2011/049511 A1 | 4/2011 |
| WO | WO-2011/049512 A1 | 4/2011 |
| WO | WO-2011/078769 A1 | 6/2011 |
| WO | WO-2011/139213 A1 | 11/2011 |
| WO | WO-2012/010078 A1 | 1/2012 |
| WO | WO-2012/050510 A1 | 4/2012 |
| WO | WO-2012/121652 A1 | 9/2012 |
| WO | WO-2012/158105 A2 | 11/2012 |
| WO | WO-2013/048312 A2 | 4/2013 |
| WO | WO-2013/055282 A2 | 4/2013 |
| WO | WO-2013/062471 A2 | 5/2013 |

OTHER PUBLICATIONS

Supplementary European Search Report dated Aug. 20, 2015 issued in corresponding European Application No. 13744212.
Natterer, Frank. "The Mathematics of Computerized Tomography: Classics in Applied Mathematics." 32 (2001): pp. 1-222.
Kak et al. "Principles of Computerized Tomographic Imaging." The Institute of Electrical Engineers, Inc. (1999).

* cited by examiner

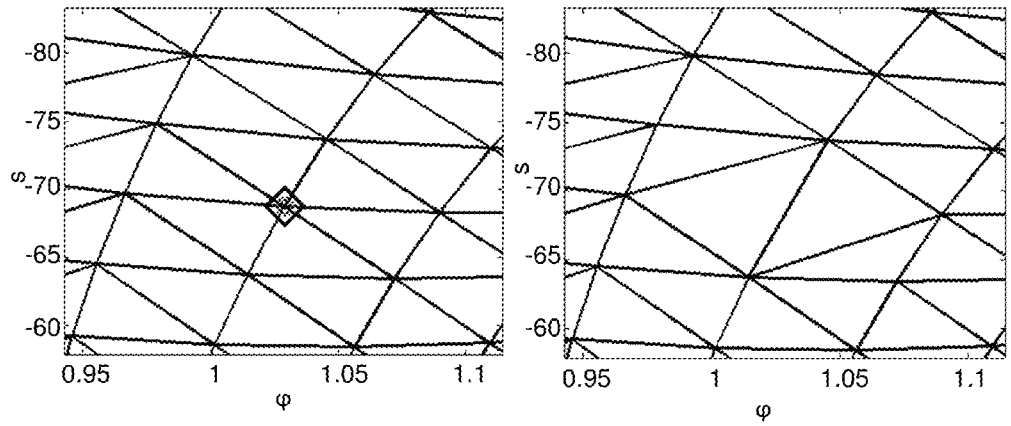
Fig. 9A                     Fig. 9B
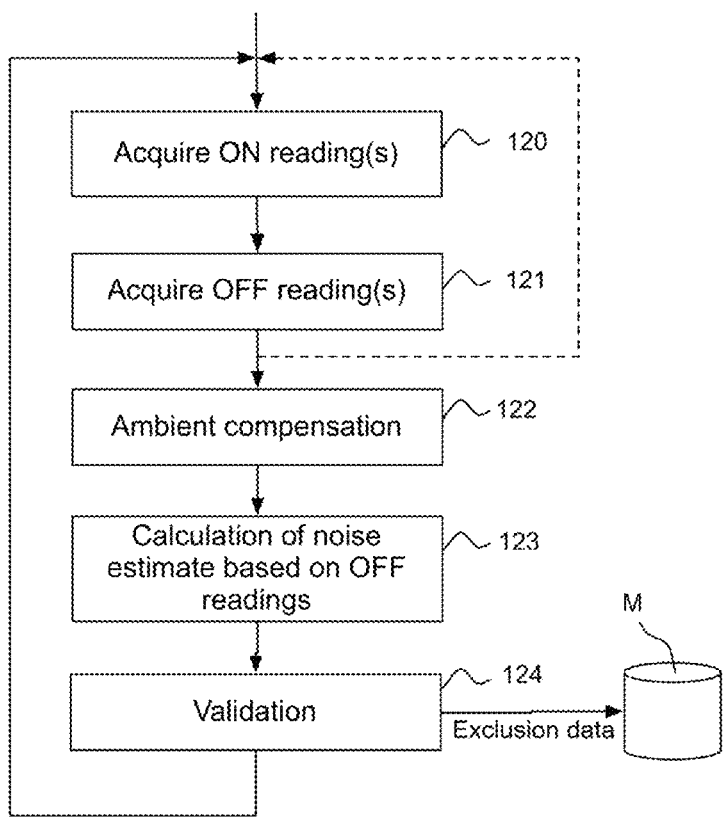
Fig. 10

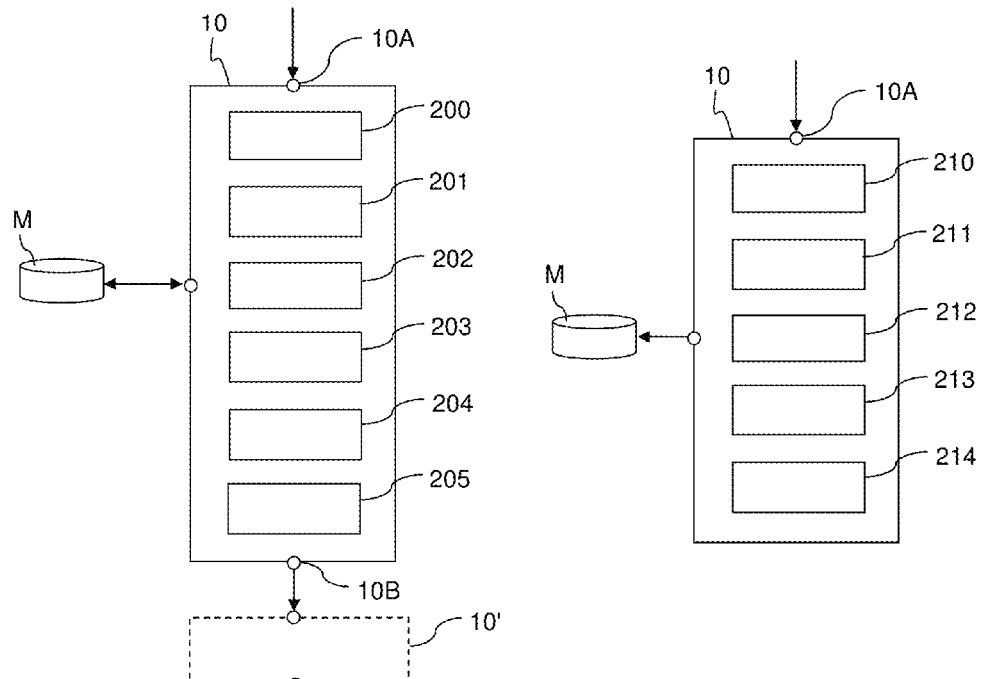
Fig. 11A                    Fig. 11B
Fig. 12A
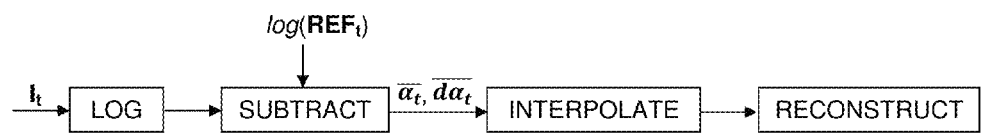
Fig. 12B
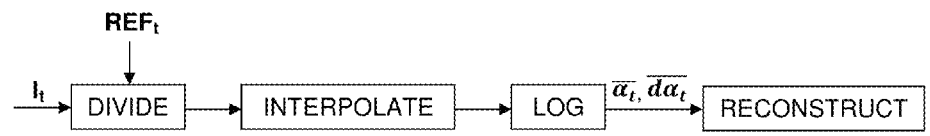
Fig. 12C

PERFORMANCE MONITORING AND CORRECTION IN A TOUCH-SENSITIVE APPARATUS

CROSS-REFERENCE TO RELATED APPLICATIONS

The present application is related to the following applications, which are all incorporated herein in their entirety by this reference: WO2010/064983, WO2011/049512, WO2011/078769, WO2011/139213, WO2012/121652, WO2012/158105, PCT/SE2012/051006 filed on Sep. 24, 2012, and PCT/SE2012/51073 filed on Oct. 8, 2012.

The present application claims the benefit of PCT/SE2013/050064 filed Jan. 29, 2013, Swedish patent application No. 1250064-1, filed 31 Jan. 2012, and U.S. provisional application No. 61/592,641, filed 31 Jan. 2012, all of which are incorporated herein by reference in their entirety.

TECHNICAL FIELD

The present invention relates to touch sensing systems and data processing techniques in relation to such systems, and in particular to techniques for performance monitoring and correction.

BACKGROUND ART

Touch sensing systems ("touch systems") are in widespread use in a variety of applications. Typically, the touch sensing systems are actuated by a touch object such as a finger or stylus, either in direct contact, or through proximity (i.e. without contact), with a touch surface. Touch sensing systems are for example used as touch pads of laptop computers, in control panels, and as overlays to displays on e.g. hand held devices, such as mobile telephones. A touch panel that is overlaid on or integrated in a display is also denoted a "touch screen". Many other applications are known in the art.

WO2010/064983 discloses a multi-touch system, which is based on frustrated total internal reflection (FTIR). Light sheets are coupled into a panel to propagate inside the panel by total internal reflection (TIR). When an object comes into contact with a touch surface of the panel, the propagating light will be attenuated at the point of touch. Arrays of light sensors are located around the perimeter of the touch surface to detect the received light for each light sheet and generate a signal value for each light path across the touch surface. The signal values of the light sensors are normalized by respective reference values and input into an image reconstruction algorithm that generates a two-dimensional distribution of attenuation values across the touch surface. This enables repeated determination of current position/size/shape of touches while one or more users interact with the touch surface.

In FTIR systems, the touches need to be detected against a background of interferences, e.g. originating from fingerprints and other types of smear on the touch surface. The influence of interferences may vary not only over time but also across the touch surface, making it difficult to properly detect the touches on the touch surface at all times. WO2011/028169 proposes manipulating the reference values to compensate for the influence of contaminations in the attenuation pattern, and WO2011/049512 proposes tracking a two-dimensional background pattern of the contamination contribution and using the background pattern to generate an attenuation pattern that is compensated for contaminations.

FTIR systems often need to be designed with a high sensitivity, since a touching object may result in only a small attenuation of the propagating light, e.g. less than 1%. Certain systems may therefore be designed to detect attenuations on the order of 0.1%-0.01%. To ensure proper touch detection, WO2011/078769 proposes monitoring the temporal variability of the signal values to identify potential causes for reduced performance of the touch system, e.g. due to component failure, and implementing corrective measures to account for unreliable signal values. WO2011/139213 further proposes the corrective measure of removing unreliable signal values from an interpolation step, which is tailored to prepare the adequate input data for a tomographic reconstruction algorithm that generates the attenuation pattern.

In view of the required sensitivity of the FTIR system, there is a continued need to improve the quality of the attenuation pattern and suppress any errors that may affect the attenuation pattern.

SUMMARY

It is an objective of the invention to at least partly overcome one or more limitations of the prior art.

Another objective is to provide an improved technique of handling signal values that are deemed unreliable in touch systems that operate by propagating signals across a touch surface.

One or more of these objectives, as well as further objects that may appear from the description below, are at least partly achieved by means of a method of enabling touch determination, a computer program product, devices for enabling touch determination, and a touch-sensitive apparatus according to the independent claims, embodiments thereof being defined by the dependent claims.

A first aspect of the invention is a method of enabling touch determination based on an output signal from a touch-sensitive apparatus. The touch-sensitive apparatus comprises a panel configured to conduct signals from a plurality of peripheral incoupling points to a plurality of peripheral outcoupling points, thereby defining actual detection lines that extend across a surface portion of the panel between pairs of incoupling and outcoupling points, at least one signal generator coupled to the incoupling points to generate the signals, and at least one signal detector coupled to the outcoupling points to generate the output signal. The method receives the output signal and operates in a sequence of repetitions to: process the output signal to generate a set of data samples, each data sample being generated to represent detected energy for one of the actual detection lines; generating an interpolated sinogram based on the data samples, the interpolated sinogram comprising interpolation samples which represent fictitious detection lines that have a desired location on the surface portion; and operate an image reconstruction function on the interpolated sinogram to generate a signal interaction pattern within at least part of the surface portion. The method further comprises an error correction step which is responsive to exclusion data that identifies a change in validity status for a data sample among the set of data samples in a current repetition. The error correction step comprises: identifying interpolation samples affected by the change in validity status; and setting each identified interpolation sample to a value that maintains a relative signal transmission of the fictitious detection line from a former repetition.

The first aspect achieves a suppression of errors that otherwise might emerge in the signal interaction pattern as a result of the change in validity status of the data sample. The affected data sample may be a previously valid data sample which is deemed invalid in the sense that it cannot be trusted, or a previously invalid data sample which is deemed valid. As will be further explained below in relation to detailed examples, simply removing or adding a data sample based on the validity change is likely to cause local errors in the interpolated sinogram, which in turn may cause artifacts in the signal interaction pattern that are mistaken for touches. The first aspect is based on the insight that such local errors may be suppressed by stipulating that the relative signal transmission of each identified interpolation point (i.e. each affected fictitious detection line) should be unaffected by the validity change. The "relative signal transmission" or "relative transmission" is a conventional term that denotes the ratio of detected energy to a baseline or reference level. The relative signal transmission is representative of the signal interaction for the fictitious detection line, and may alternatively be expressed as an attenuation or a relative loss of energy. The first aspect thus operates to maintain the relative signal transmission (signal interaction, attenuation or loss of energy) between a current and a former repetition. It is to be noted, however, that the relative signal transmission need not be explicitly calculated, or even be known, for the error correction step to be able to manipulate the identified interpolation sample.

According to the first aspect, the data samples represent detected energy, which infers that each data sample is a value of an energy parameter which is computable from the output signal only, such as a measure of the energy (or equivalently, power or intensity) of the light that is received by the at least one signal detector via the respective outcoupling point, or a logarithm of this measure. Thus, in one embodiment, each data sample in the set of data samples is generated by extracting the detected energy for the respective actual detection line from the output signal and, optionally, by computing the logarithm of the detected energy.

In one embodiment, the interpolated sinogram is generated to represent relative values between energy values and reference energy values for the fictitious detection lines. The relative values may, but need not, be equal to the relative signal transmission. In a specific embodiment, each relative value is given as an attenuation value, so as to enable the signal interaction pattern to represent a distribution of attenuation values.

The relative values may be obtained by interpolation of either relative or absolute values.

In one embodiment, the set of data samples are first converted to a set of relative values for the actual detection lines by means of a corresponding set of reference energy values for the actual detection lines, whereupon an interpolation function is operated on the relative values to generate the interpolation samples for the fictitious detection lines. In such an embodiment, the interpolation is thus performed on the relative values for the actual detection lines. As exemplified in the detailed description, the respective relative values that are input to the interpolation function may be computed as a ratio between a respective data sample in the set of data samples and a corresponding reference energy value, or as a logarithm of such a ratio, or, if the data samples are representative of logarithmic energy, as a difference between the data samples and logarithmic reference energy values.

In an alternative embodiment, the step of generating the interpolated sinogram comprises: operating an interpolation function on the data samples to generate the energy values for the fictitious detection lines, and converting the energy values to the relative values by means of the reference energy values for the fictitious detection lines. The interpolation is thus performed on absolute values. Such an approach has been found to be particularly sensitive to validity changes among the data samples. Again, the relative values may be computed as a ratio between a respective data sample in the set of data samples and a corresponding reference energy value, or as a logarithm of such a ratio, or, if the data samples as representative of logarithmic energy, as a difference between the data samples and logarithmic reference energy values.

The time scale of the reference energy values may be set to achieve a desired property of the resulting signal interaction pattern. If the signal interaction pattern should represent interaction changes on a long time scale, the reference energy values may be given with respect to a calibration step performed at e.g. manufacture or start-up. If the signal interaction pattern should represent interaction changes on a shorter time scale, the reference energy values may be obtained as a function of energy values for the fictitious detection lines that were generated, by interpolation, in a preceding repetition with a given time difference to the current repetition.

Accordingly, in one embodiment that enables touch detection on a long time scale, the reference energy values for the fictitious detection lines are generated by operating the interpolation function on data samples obtained from the output signal in a calibration step without objects in contact with the surface portion, and the error correction step comprises manipulating the reference energy value of each identified interpolation sample so as to maintain the relative signal transmission of the corresponding fictitious detection line from the former repetition, which may (but need not) be the immediately preceding repetition. This is equivalent to assuming that the fictitious detection line (that corresponds to the identified interpolation sample) exhibits no change in interaction between the former repetition and the current repetition.

In an alternative embodiment that enables touch detection on a shorter time scale, the reference energy values are intermittently updated to represent the energy values in a preceding repetition, such that the relative values represent a change in the relative signal transmission between the current and the preceding repetition for each fictitious detection line. The reference energy values may e.g. be updated in each repetition. It is to be noted that the number of repetitions between the current repetition and the preceding repetition may be selected differently depending of the desired properties of the resulting signal interaction pattern.

To enable detection on the shorter time scale, the error correction step may operate in different ways to maintain the relative signal transmission. In one embodiment, the error correction step comprises setting the relative value of each identified interpolation sample to zero. This maintains the relative signal transmission, since the relative value represents a change in the relative signal transmission between the current and the preceding repetition. In an alternative embodiment, the error correction step comprises setting, for each identified interpolation sample, the reference energy value of the former repetition equal to the energy value of the current repetition. Both of these embodiments are capable of maintaining the relative signal transmission between the former repetition and the current repetition without requiring the relative signal transmission to be computed or tracked over time.

In a first implementation, the former repetition is immediately preceding the current repetition. In a second implementation, the former repetition is separated from the current repetition by a number of intermediate repetitions. In the second implementation, the error correction step may further comprise setting the reference energy value for the number of intermediate repetitions equal to the energy value of the current repetition. This will enable detection of touches already in the signal interaction pattern generated in the next repetition.

Typically, but not necessarily, the time separation (number of repetitions) that is used by the error correction to maintain the relative signal transmission is equal to the time separation (number of repetitions) between the energy values and the reference energy values that are used for calculating the relative values.

In one embodiment, which is designed for a touch-sensitive apparatus that comprises a plurality of signal generators and a plurality of signal detectors and is operated to turn the signal generators ON and OFF during each repetition, such that the output signal is generated to comprise ON energy values for the actual detection lines and at least one OFF energy value for each signal detector, the method of the first aspect further comprises a validation process designating a detection line as valid or invalid and for generating the exclusion data, the validation process comprising: obtaining the OFF energy values from the output signal, generating a noise estimate for each actual detection line as a function of the OFF energy values, and validating the actual detection lines based on the noise estimate.

In one embodiment, the noise estimate is generated to represent the variability in a time sequence of OFF energy values for the signal detector associated with the actual detection line.

In one embodiment, an actual detection line is designated as invalid if the noise estimate exceeds a noise limit, and/or if the ON energy value of the actual detection line exceeds a saturation limit.

In one embodiment, the step of processing the output signal to generate the set of data samples comprises: obtaining the ON energy values from the output signal, obtaining an estimated ambient value for each actual detection line based on the OFF energy value for the signal detector associated with the actual detection line, and generating an ambient-compensated energy value by subtracting the estimated ambient value from the ON energy value for each actual detection line. In one embodiment, an actual detection line is designated as invalid if the ratio between the ambient-compensated energy value and the noise estimate is less than a minimum ratio limit, and/or if the ambient-compensated energy value is less than a minimum energy limit.

In one embodiment, the validation process is configured to promote a change of designation from valid to invalid over a change of designation from invalid to valid. This provides a stabilization of the processing by reducing the need to activate the error correction.

A second aspect of the invention is a computer program product comprising computer code which, when executed on a data-processing system, is adapted to carry out the method of the first aspect.

A third aspect of the invention is a device for enabling touch determination based on an output signal from a touch-sensitive apparatus, the touch-sensitive apparatus comprising a panel configured to conduct signals from a plurality of peripheral incoupling points to a plurality of peripheral outcoupling points, thereby defining actual detection lines that extend across a surface portion of the panel between pairs of incoupling and outcoupling points, at least one signal generator coupled to the incoupling points to generate the signals, and at least one signal detector coupled to the outcoupling points to generate the output signal, said device comprising: an input for receiving the output signal; and a signal processor configured to, repeatedly in a sequence of repetitions: process the output signal to generate a set of data samples, each data sample being generated to represent detected energy for one of the actual detection lines; generate an interpolated sinogram based on the data samples, the interpolated sinogram comprising interpolation samples which represent fictitious detection lines that have a desired location on the surface portion; and operate an image reconstruction function on the interpolated sinogram to generate a signal interaction pattern within at least part of the surface portion; wherein the signal processor is further configured to perform an error correction responsive to exclusion data that identifies a change in validity status for a data sample among the set of data samples in a current repetition, wherein said error correction comprises: identifying interpolation samples affected by the change in validity status; and setting each identified interpolation sample to a value that maintains a relative signal transmission of the fictitious detection line from a former repetition.

A fourth aspect of the invention is a device for enabling touch determination based on an output signal from a touch-sensitive apparatus, the touch-sensitive apparatus comprising a panel configured to conduct signals from a plurality of peripheral incoupling points to a plurality of peripheral outcoupling points, thereby defining actual detection lines that extend across a surface portion of the panel between pairs of incoupling and outcoupling points, at least one signal generator coupled to the incoupling points to generate the signals, and at least one signal detector coupled to the outcoupling points to generate the output signal, wherein the device is operable in a sequence of repetitions and comprises: means for processing, in each repetition, the output signal to generate a set of data samples, each data sample being generated to represent detected energy for one of the actual detection lines; means for generating, in each repetition, an interpolated sinogram based on the set of data samples, the interpolated sinogram comprising interpolation samples which represent fictitious detection lines that have a desired location on the surface portion; and means for operating, in each repetition, an image reconstruction function on the interpolated sinogram to generate a signal interaction pattern within at least part of the surface portion; wherein the device further comprises means for error correction, which is responsive to exclusion data that identifies a change in validity status for a data sample among the set of data samples in a current repetition, said means for error correction being configured to identify interpolation samples affected by the change in validity status; and set each identified interpolation sample to a value that maintains a relative signal transmission of the fictitious detection line from a former repetition.

A fifth aspect of the invention is a touch-sensitive apparatus, comprising: a panel configured to conduct signals from a plurality of peripheral incoupling points to a plurality of peripheral outcoupling points, thereby defining actual detection lines that extend across a surface portion of the panel between pairs of incoupling and outcoupling points; means for generating the signals at the incoupling points; means for generating an output signal based on detected signals at the outcoupling points; and the device for enabling touch determination according to the third or fourth aspects.

Any one of the above-identified embodiments of the first aspect may be adapted and implemented as an embodiment of the second to fifth aspects to achieve the corresponding technical advantages.

Still other objectives, features, aspects and advantages of the present invention will appear from the following detailed description, from the attached claims as well as from the drawings.

BRIEF DESCRIPTION OF DRAWINGS

Embodiments of the invention will now be described in more detail with reference to the accompanying schematic drawings.

FIGS. 9A-9B illustrate how a 2D interpolation function may be updated when sampling points are removed from reconstruction.

FIG. 10 is a flow chart of a method for validating sampling points.

FIGS. 11A-11B are block diagrams of devices that implement the methods of FIGS. 7 and 10.

FIGS. 12A-12D illustrate different sequences of processing steps that involve an interpolation of relative values and that result in a signal interaction pattern being generated.

DETAILED DESCRIPTION OF EXAMPLE EMBODIMENTS

Figure 1A:
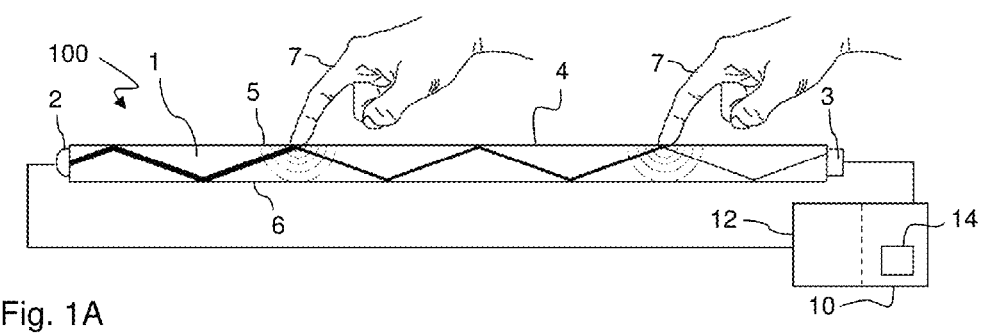
FIGS. 1A-1B are section and top plan views of a touch-sensing FTIR system.

Below follows a description of example embodiments of a technique for enabling extraction of touch data for objects in contact with a touch surface of a touch-sensitive apparatus. Throughout the following description, the same reference numerals are used to identify corresponding elements.

1. Touch-Sensitive Apparatus

Figure 1B:
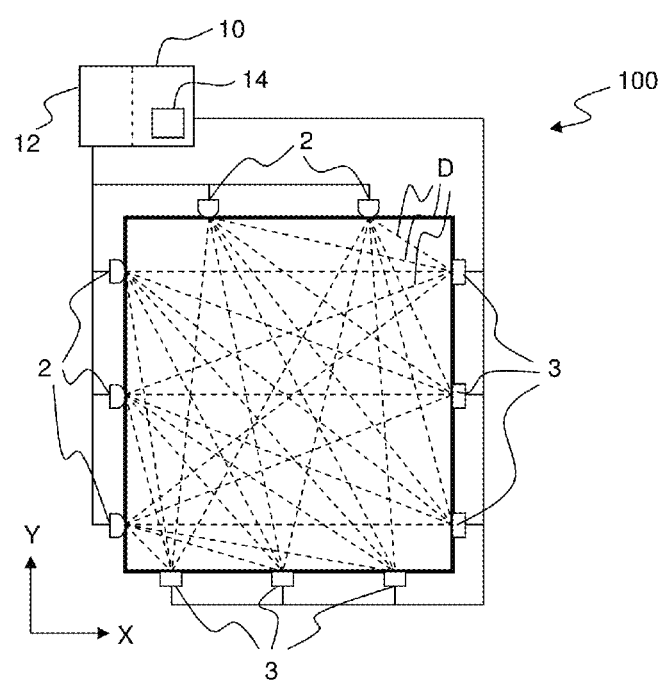

Embodiments of the inventions relate to signal processing in relation to a touch-sensitive apparatus which is based on the concept of transmitting energy of some form across a touch surface, such that an object that is brought into close vicinity of, or in contact with, the touch surface causes a local decrease in the transmitted energy. The apparatus may be configured to permit transmission of energy in one of many different forms. The emitted signals may thus be any radiation or wave energy that can travel in and across the touch surface including, without limitation, light waves in the visible or infrared or ultraviolet spectral regions, electrical energy, electromagnetic or magnetic energy, or sonic and ultrasonic energy or vibration energy. Example embodiments of the invention will be described in relation to a touch-sensitive apparatus 100, which is shown in FIGS. 1A-1B and is based on the concept of FTIR (Frustrated Total Internal Reflection), also denoted "FTIR system". The apparatus 100 operates by transmitting light inside a panel 1, from light emitters 2 to light sensors or detectors 3, so as to illuminate a touch surface 4 from within the panel 1. The panel 1 is made of solid material in one or more layers and may have any shape. The panel 1 defines an internal radiation propagation channel, in which light propagates by internal reflections. In the example of FIG. 1, the propagation channel is defined between the boundary surfaces 5, 6 of the panel 1, where the top surface 5 allows the propagating light to interact with touching objects 7 and thereby defines the touch surface 4. This is achieved by injecting the light into the panel 1 such that the light is reflected by total internal reflection (TIR) in the touch surface 4 as it propagates through the panel 1. The light may be reflected by TIR in the bottom surface 6 or against a reflective coating thereon. It is also conceivable that the propagation channel is spaced from the bottom surface 6, e.g. if the panel comprises multiple layers of different materials. The apparatus 100 may be designed to be overlaid on or integrated into a display device or monitor.

The apparatus 100 allows an object 7 that is brought in contact with the touch surface 4 to interact with the propagating light at the point of touch. In this interaction, part of the light may be scattered by the object 7, part of the light may be absorbed by the object 7, and part of the light may continue to propagate in its original direction across the panel 1. Thus, the touching object 7 causes a local frustration of the total internal reflection, which leads to a decrease in the energy (or, equivalently, power or intensity) of the transmitted light, as indicated by the thinned lines downstream of the touching objects 7 in FIG. 1A.

The emitters 2 are distributed along the perimeter of the touch surface 4 to generate a corresponding number of light sheets inside the panel 1. In the example of FIG. 1B, each emitter 2 generates a beam of light that expands in the plane of the panel 1 while propagating in the panel 1. Each beam propagates from one or more entry or incoupling points (ports) on the panel 1. The detectors 3 are distributed along the perimeter of the touch surface 4 to receive the light from the emitters 2 at a number of spaced-apart outcoupling points (ports) on the panel 1. It should be understood that the incoupling and outcoupling points merely refer to the position where the beam enters and leaves, respectively, the panel 1. Thus, although not shown in FIG. 1B, one emitter/detector may be optically coupled to a number of incoupling/outcoupling points.

The detectors 3 collectively provide an output signal, which is received and sampled by a signal processor 10. The output signal contains a number of sub-signals, also denoted "projection signals", each representing the energy of light emitted by a certain light emitter 2 and received by a certain detector 3. The projection values for all detection lines at time point t are collectively represented by $I_t$. Depending on implementation, the signal processor 10 may need to process the output signal for separation of the individual projection signals. Conceptually, the touch apparatus 100 is considered to define a grid of detection lines D on the touch surface 4, where each detection line D corresponds to a light propagation path from an emitter 2 to a detector 3, as projected onto the touch surface 4. Thus, the projection signals represent the received energy or power of light on the individual detection lines D. It is realized that the touching object 7 results in a decrease (attenuation) of the received energy on one or more detection lines D.

As will be explained below, the signal processor 10 may be configured to process the projection signals so as to determine a distribution of attenuation values (for simplicity, referred to as an "attenuation pattern") across the touch surface 1, where each attenuation value represents a local attenuation of light. The attenuation pattern may be represented in many different ways, e.g. as attenuation values arranged in a regular x-y-grid, such as in an ordinary digital image, although other types of grids are conceivable, e.g. hexagonal patterns or triangular meshes. The attenuation pattern may be further processed by the signal processor 10 or by a separate device (not shown) for touch determination, which may involve extraction of touch data, such as a position (e.g. x,y coordinates), a shape or an area of each touching object. In the following, a "frame" denotes a repeated event starting with data collection and ending with determination of touch data.

In the illustrated example, the apparatus 100 also includes a controller 12 which is connected to selectively control the activation of the emitters 2 and, possibly, the readout of data from the detectors 3. The signal processor 10 and the controller 12 may be configured as separate units, or they may be incorporated in a single unit. One or both of the signal processor 10 and the controller 12 may be at least partially implemented by software executed by a processing unit 14.

It is to be understood that FIG. 1 merely illustrates one example of an FTIR system. For example, the detection lines may instead be generated by sweeping or scanning one or more beams of light inside the panel 1, and the light may instead be coupled into and out of the panel 1 via the top and bottom surfaces 5, 6, e.g. by the use of dedicated coupling elements attached to the panel 1. Examples of alternative FTIR systems are e.g. disclosed in U.S. Pat. No. 6,972,753, U.S. Pat. No. 7,432,893, US2006/0114237, US2007/0075648, WO2009/048365, WO2010/006882, WO2010/006883, WO2010/006884, WO2010/006885, WO2010/006886, WO2010/064983, and WO2010/134865, which are all incorporated herein by this reference. The inventive concept may be applied to such alternative FTIR systems as well.

2. Signal Processing

It is known in the art to operate an image reconstruction function or algorithm on current projection values in the output signal, so as to determine a current attenuation pattern on the touch surface 4. By repeatedly determining, in the above-mentioned "frames", the attenuation pattern and identifying presence of touches in the attenuation pattern, it is possible to track objects that interact with the touch surface.

Embodiments of the invention may use any available algorithm for image reconstruction based on projection signal values, including tomographic reconstruction methods such as Filtered Back Projection, FFT-based algorithms, ART (Algebraic Reconstruction Technique), SART (Simultaneous Algebraic Reconstruction Technique), etc. Alternatively, the reconstruction function may generate the attenuation pattern by adapting one or more basis functions and/or by statistical methods such as Bayesian inversion. Examples of reconstruction functions designed for use in touch determination are found in WO2010/006883, WO2009/077962, WO2011/049511, WO2011/139213, WO2012/050510, and PCT/SE2012/051142 filed on Oct. 24, 2012, all of which are incorporated herein by reference. Conventional image reconstruction techniques are found in the mathematical literature, e.g. "The Mathematics of Computerized Tomography" by Natterer, and "Principles of Computerized Tomographic Imaging" by Kak and Slaney.

The reconstruction function is designed based on the assumption that the input values $\overline{\alpha}_t$ at time point t depend on the attenuation pattern, $A_t$, according to a projection function P, which reflects the properties of the physical touch system: $\overline{\alpha}_t = P(A_t)$. The reconstruction algorithm is thus designed to reconstruct $A_t$ from $\overline{\alpha}_t$ by use of a reconstruction function: $A_t = P'(\overline{\alpha}_t)$.

It is to be understood that the format of the input values $\overline{\alpha}_t$ may be specific to the reconstruction function P'. To enable reconstruction of an attenuation pattern, the input values $\overline{\alpha}_t$ may be represented as attenuation values for individual detection lines. Such attenuation values may e.g. be based on transmission values obtained by dividing the projection value $I_k$ of the k:th detection line by a respective reference value: $T_k = I_k / REF_k$. By proper choice of reference values, the transmission values may be generated to represent the fraction (e.g. in the range [0, 1]) of the available light energy that has been measured on each of the detection lines, i.e. the relative signal transmission of the detection line. The input value of each detection line may e.g. be given by: $\overline{\alpha}_k = -\log(T_k)$ or an approximation thereof, e.g. $\overline{\alpha}_k = 1 - T_k$ (valid for $T_k$ close to 1). This choice of input value format may be understood by considering that the transmission along a detection line $D_k$ may be represented as: $T_k = I_k / REF_k = e^{-\int \alpha(x,y) dl}$, where $\alpha(x,y)$ is the attenuation pattern along the detection line $D_k$. Thereby, $\overline{\alpha}_k$ represents an aggregation of the attenuation along the detection line: $\overline{\alpha}_k = -\log(T_k) = \int \alpha(x,y) dl$.

The reference values for all detection lines at time point t are collectively represented by $REF_t$. As will be explained, the choice of reference values $REF_t$ will decide the time scale of the reconstructed attenuation pattern $A_t$.

Figure 2:
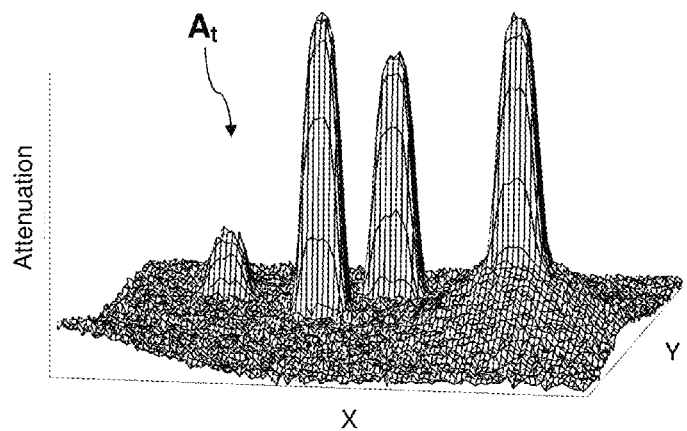
FIG. 2 is a 3D plot of a total attenuation pattern.

In a first embodiment, further discussed in WO2010/064983 and WO2011/049512, as well as WO2012/121652, the reference values are given by the output signal at a certain calibration time point when no touching object (finger, stylus, etc) is present on the touch surface, such as when the assembly of the apparatus 100 is finalized, at start-up, or when a user initiates a reset operation of the apparatus 100. These reference values, also denoted calibration values and represented by $I_0$, may be stored in a memory unit of the device 10. By using $I_0$, the reconstructed attenuation pattern $A_t$ will represent the total accumulated attenuation on the touch surface since the calibration time point. Such an attenuation pattern $A_t$ is illustrated in FIG. 2 as a 3D plot in the coordinate system X,Y of the touch surface (cf. FIG. 1B).

In a second embodiment, the reference values are updated repeatedly during operation of the apparatus, e.g. at time intervals $\Delta t$, by setting the reference values equal to the current projection values and using the updated reference values in the next time interval. For reasons to become apparent, the resulting input values are denoted change values and are represented by $\overline{d\alpha}_t$. The change values are thus given by: $\overline{d\alpha}_t = -\log(I_t / I_{t-\Delta t}) = \log(I_{t-\Delta t}) - \log(I_t)$. This expression may be re-arranged and converted into the type of input values obtained in the first embodiment:

$$\overline{d\alpha}_t = -\log\left(\frac{I_t}{I_{t-\Delta t}}\right) = -\log\left(\frac{I_t}{I_0} \Big/ \frac{I_{t-\Delta t}}{I_0}\right) = \log\left(\frac{I_{t-\Delta t}}{I_0}\right) - \log\left(\frac{I_t}{I_0}\right) = \overline{\alpha}_t - \overline{\alpha}_{t-\Delta t}.$$

As seen, the change values $\overline{d\alpha_t}$ represent the change in relative signal transmission for each detection line during the time interval $\Delta t$. It is also realized that the change values $\overline{d\alpha_t}$ result in an attenuation pattern, denoted difference pattern $dA_t$, which corresponds to the difference in attenuation patterns between time points t and t-$\Delta t$, provided that the reconstruction is at least approximately linear:

$$dA_t = P'(\overline{d\alpha_t}) = P'(\overline{\alpha_t}) - P'(\overline{\alpha_{t-\Delta t}}) = A_t - A_{t-\Delta t}.$$

The time interval $\Delta t$ may be set to different values depending on implementation.

Figure 3A:
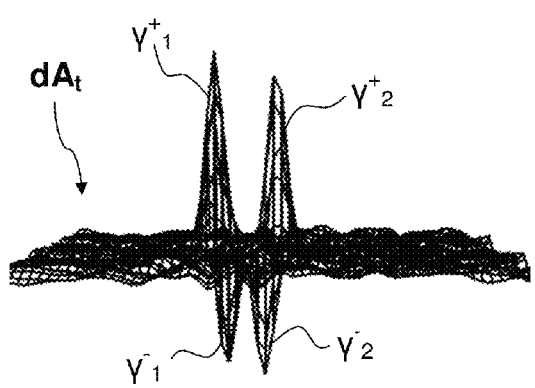
FIGS. 3A-3B are plots of a difference pattern representing two moving objects.
Figure 3B:
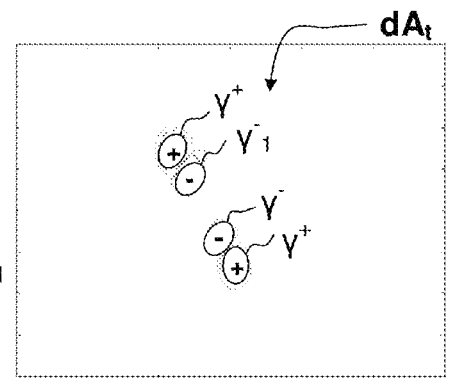

In a first implementation of the second embodiment, disclosed in further detail in PCT/SE2012/51073, filed on Oct. 8, 2012, a first and a second attenuation pattern are reconstructed on different time scales. The first attenuation pattern may be the total pattern $A_t$ generated by the first embodiment, and the second interaction pattern may be a difference pattern $dA_t$ generated by the second embodiment, e.g. with $\Delta t$ in the approximate range of 5 ms-5 s. The time interval may thus range from 1 frame to several frames. The use of a difference pattern $dA_t$ may improve detection of fast moving objects compared to objects that move slowly or not at all on the touch surface, while also reducing the impact of contaminations on the touch surface. The difference pattern $dA_t$ mainly indicates the temporal change in attenuation caused by moving objects in contact with the touch surface, as well as objects that are removed from or added to the touch surface during $\Delta t$. A moving object generally appears as a "dipole peak" in the difference pattern, i.e. a combination of a positive peak and a negative peak. FIG. 3A is a 3D plot of a difference pattern $dA_t$ containing two dipole peaks $\gamma_1^+, \gamma_1^-$ and $\gamma_2^+, \gamma_2^-$. FIG. 3B is a plan view of the difference pattern $dA_t$ in FIG. 3A. When an object is moved during $\Delta t$, the corresponding touch occupies new pixels, resulting in a positive peak, and leaves old pixels, resulting in a negative peak. If an object is removed from the touch surface, the removed touch will be represented by a single negative peak in the difference pattern, and if an object is brought into contact with the touch surface, the new touch will be represented by a single positive peak. In FIG. 3B, it is realized that the objects have moved away from each other during $\Delta t$. In a variation of the first implementation, the change values $\overline{d\alpha_t}$ that are obtained based on the output signal are deliberately distorted, before being input to the reconstruction function, so as to enhance weakly interacting touches over strongly interacting touches and interferences (reconstruction artifacts) in the resulting difference pattern $dA_t$. In a further variation of the first implementation, the reference values are updated to factor in projection values from more than one time point. For example, the change values $\overline{d\alpha_t}$ may be generated as a function of a current projection value $I_t$ and a temporally low-pass filtered projection value $\overline{I_{t-m}}$, e.g. $\overline{d\alpha_t} = \log(\overline{I_{t-m}}) - \log(I_t)$, where $\overline{I_{t-m}}$ or $\log(\overline{I_{t-m}})$ may be computed using any temporal low-pass filter. One such example is an exponential forget filter, such as: $\overline{I_{t-m}} = \overline{I_{t-m-1}} - \epsilon \cdot (I_{t-m} - \overline{I_{t-m-1}})$, or $\log(\overline{I_{t-m}}) = \log(\overline{I_{t-m-1}}) - \epsilon \cdot (\log(I_{t-m}) - \log(\overline{I_{t-m-1}}))$, where $0 < E < 1$. It is also possible to compute $\overline{I_{t-m}}$ or $\log(\overline{I_{t-m}})$ using a moving average, etc. In all of these examples, m denotes frames and may have any suitable number, including 0.

In a second implementation of the second embodiment, disclosed in further detail in PCT/SE2012/051006, filed on Sep. 24, 2012, the total attenuation pattern $A_t$ is generated by accumulating the difference pattern across the time intervals $\Delta t$: $A_t = A_{t-\Delta t} + dA_t$. In a variant of the second implementation, a total pattern, which is compensated for the influence of contaminations on the touch surface and denoted an offset pattern $o_t$, is generated by accumulating the difference pattern across the time intervals $\Delta t$: $o_t = o'_{t-\Delta t} + dA_t$. Before being used for accumulation in the next time interval, each pixel in the offset pattern $o_t$ is compensated for contamination, e.g. according to an exponential forget algorithm:

$$o'_t = (1-\varepsilon) \cdot o_t \begin{cases} \varepsilon = 0, \text{ if touch in pixel of } o_t \\ \varepsilon = 0.1, \text{ if no touch in pixel of } o_t \end{cases}$$

which will cause the offset pattern $o_t$ to gradually approach zero attenuation in regions without touch interaction, while other pixels/regions will have a value representative of the local touch interaction. In the second implementation, it is currently preferred that the time interval $\Delta t$ is a single frame, i.e. that the reference values are set equal to the current projection vales and are used in the next frame.

Figure 4:
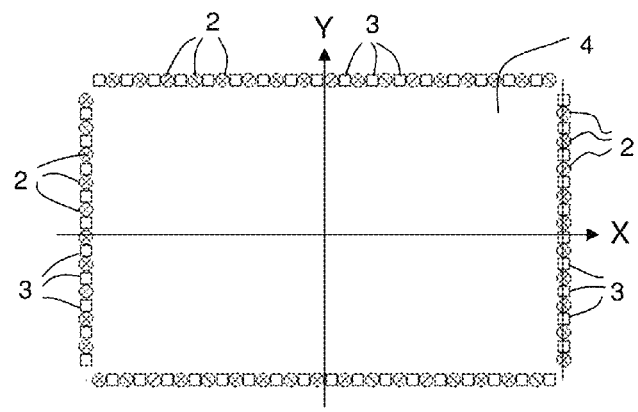
FIG. 4 is a top plan view of an FTIR system with an interleaved arrangement of emitters and detectors.
Figure 5:
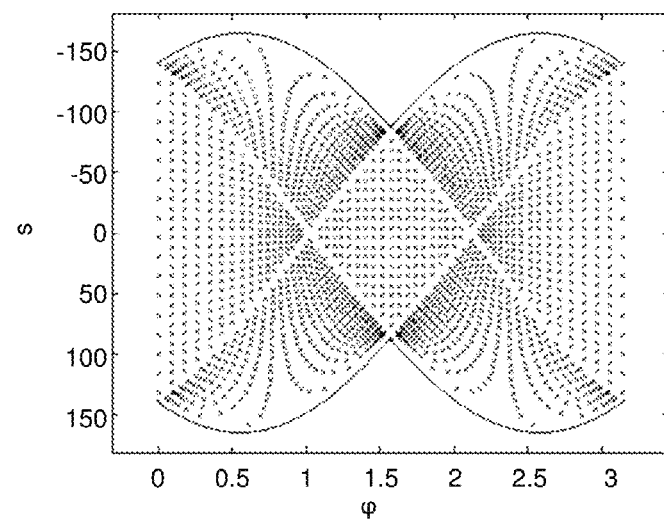
FIG. 5 is a sinogram of sampling points defined by the interleaved arrangement in FIG. 4.
Figure 6A:
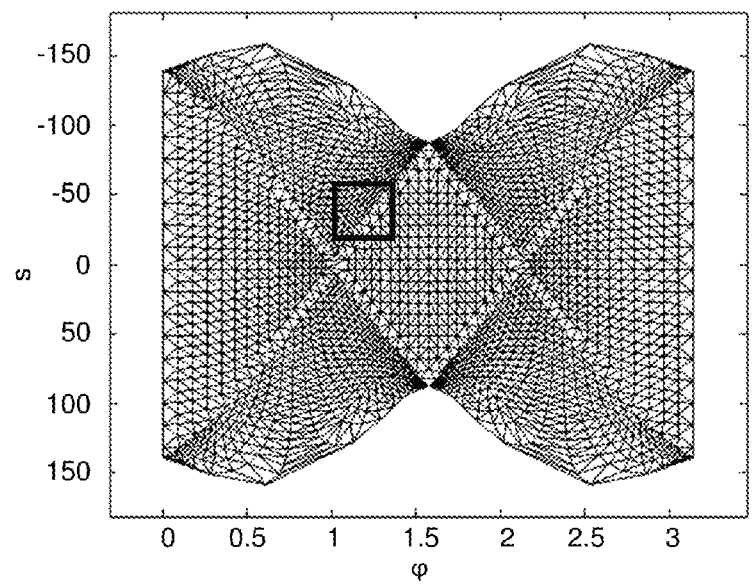
FIG. 6A is a graph of a 2D interpolation function for an interleaved arrangement.
Figure 6B:
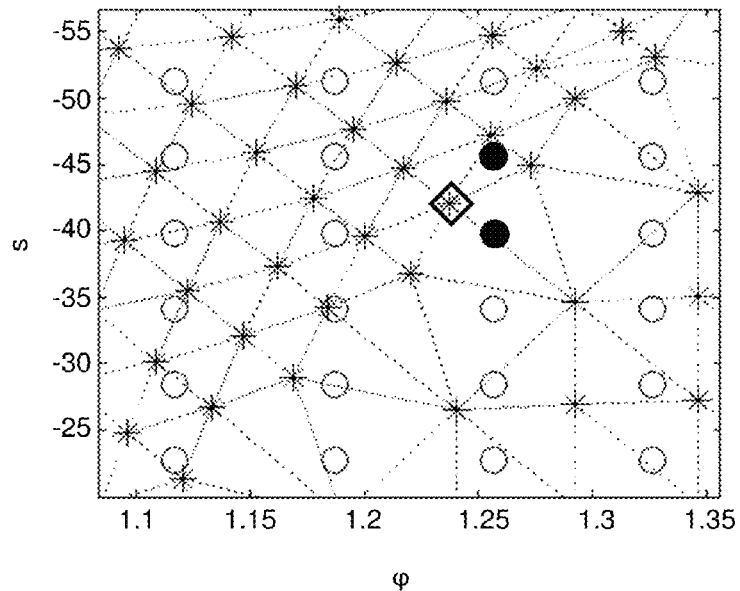
FIG. 6B illustrates the generation of interpolation points using the interpolation function of FIG. 6A.

As shown in aforesaid WO2011/139213, the image reconstruction processing may require a transformation of the sampling points by means of interpolation to enable use of existing image reconstruction techniques, such as tomographic processing. Each sampling point corresponds to a detection line of the apparatus and may be defined by two dimensions or parameter values that represent the unique location of the detection line on the touch surface. In the following example, the dimensions are given by an angle $\phi$ in relation to a reference line on the touch surface and a distance s from the reference line. To further explain this concept, FIG. 4 is a top plan view of an apparatus with an "interleaved arrangement" in which the emitters 2 and detectors 3 are alternated along the perimeter of the touch surface 4. FIG. 5 illustrates the sampling points (corresponding to detection lines, and thus to measured projection values) in the $\phi$-s-plane for the interleaved arrangement. The data in FIG. 5 is conventionally denoted a "sinogram" and is represented by g herein. To facilitate and/or improve image reconstruction, interpolation is applied to generate a "matched sinogram", represented by g' herein, in which new sampling points are generated with a placement in the $\phi$-s-plane that matches a standard geometry for tomographic processing. The new sampling points generated by interpolation are denoted "matched sampling points" or "interpolation points" herein. The interpolation in the sinogram corresponds to calculating projection values for fictitious detection lines with desired locations on the touch surface. FIG. 6A is an example of an interpolation function in the $\phi$-s-plane for use in generating matched sampling points (interpolation points) for the data in FIG. 5. The interpolation function is based on Delaunay triangulation and comprises a mesh of non-overlapping triangles adapted to the sampling points. FIG. 6B is a close-up of the rectangular region in FIG. 6A to illustrate the sampling points (stars), the Delaunay triangulation (dotted lines extending between the sampling points), and the interpolation points (circles). Thus, the values of the interpolation points are calculated by operating the Delaunay triangulation on the projection values in the sampling points. The interpolation points typically replace the sampling points in the subsequent calculations, although it is possible that a subset of the sampling points are retained to form part of the matched sampling points. As explained in aforesaid WO2011/139213, there are a multitude of alternative interpolation techniques that may be used, including Fourier transformation and weighted average interpolation.

A further alternative is disclosed in U.S. 61/552,024, filed on Oct. 27, 2011, in which the matched sinogram is generated, e.g. by any of the above-mentioned interpolation techniques, such that the matched sampling points transform to Fourier coefficients arranged as data points on a pseudo-polar grid in a Fourier domain.

3. Handling of Faulty Detection Lines

As suggested in aforesaid WO2011/139213, the apparatus may be provided with an ability of identifying faulty detection lines (also denoted "invalid" or "corrupt" detection lines), i.e. detection lines that are deemed to cause problems in the reconstruction process and/or introduce major errors in reconstructed attenuation pattern. For example, if an emitter or a detector starts to perform badly, or not at all, during operation of the apparatus, this may have a significant impact on the attenuation pattern. The apparatus may implement an error handling that validates the detection lines, e.g. every n:th frame (n≥1), and dynamically assigns a valid or invalid state to each detection line (sampling point) depending on the outcome of the validation. Different examples of validation criteria are given below in Chapter 4.

When a sampling point is set to an invalid state, it may be removed from the interpolation, at least until the sampling point is again set to the valid state. Such removal is exemplified in FIG. 6B, in which a square designates a sampling point (star) that is deemed corrupt. In the illustrated example, using the Delaunay triangulation shown by dotted lines, a removal of the corrupt sampling point will affect the values of the interpolation points marked by filled circles. It should be noted there is no direct link between the states of the sampling points and the states of the affected interpolation points. If a sampling point is set to invalid state, this does not mean that every affected interpolation point also should be set to the invalid state, but instead a value of the affected interpolation point(s) is computed by interpolation of other sampling points in the neighborhood. However, as will be further exemplified below, the removal may cause a distortion of the values of the affected interpolation points, since the interpolation is now based on a different combination of sampling points. Thus, a state change of a detection line (sampling point) is not unlikely to result in a disruption of the matched sinogram, which in turn may lead to artifacts in the reconstructed pattern that are mistaken for touches.

3.1. Interpolation of Relative Values

The interpolation operates on the values of the sampling points. These values may be given as relative values (normalized values) for the respective detection line. As indicated above in Chapter 2, the relative values may be calculated by normalizing the projection values $I_t$ by reference values, $REF_t$ which may be given as calibration values $I_0$, recently measured energy values $I_{t-\Delta t}$, or an average $\overline{I_{t-m}}$ of recently measured energy values for the respective detection line. Thus, the sampling points in relative format may, e.g., be given as input values $\overline{\alpha_t}$ or $\overline{d\alpha_t}$, or as transmission values e.g. given by $I/REF_t$. FIGS. 12A-12C illustrate different processing pipelines for generating an attenuation pattern based on the projection values $I_t$, by operating the interpolation on relative values.

In FIGS. 12A-12B, the values of the sampling points are formatted as input values $\overline{\alpha_t}$ or change values $\overline{d\alpha_t}$, whereby the resulting values of the interpolation points in the matched sinogram may be directly processed for reconstruction of an attenuation pattern, $A_t = P'(\overline{\alpha_t})$, and a difference pattern, $dA_t = P'(\overline{d\alpha_t})$, respectively. In FIG. 12A, the input or change values $\overline{\alpha_t}$, $\overline{d\alpha_t}$ are generated by dividing the respective projection value by the respective reference value and taking the logarithm of the result, e.g. $-\log(I_t/REF_t)$. In FIG. 12B, the input or change values $\overline{\alpha_t}$, $\overline{d\alpha_t}$ are generated by taking the logarithm of the projection values and subtracting the resulting values from corresponding logarithmic reference values, e.g. $\log(REF_t)-\log(I_t)$.

In FIG. 12C, the values of the sampling points are formatted as $I_t/REF_t$, by dividing the respective projection value by the respective reference value. The resulting interpolation values are converted, by operating a logarithm function on the interpolation values, into input values $\overline{\alpha_t}$ or change values $\overline{d\alpha_t}$ which are then processed for reconstruction of $A_t$ or $dA_t$.

Figure 12D:
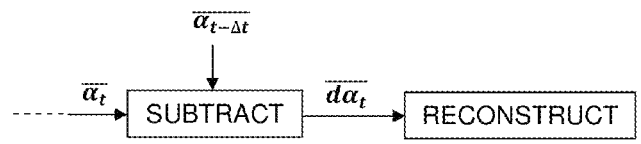

It should be noted that a difference pattern $dA_t$ may alternatively be obtained by generating the matched sinogram to represent input values $\overline{\alpha_t}$, e.g. according to any one of the techniques in FIGS. 12A-12C, and then subtracting the matched sinogram by a matched sinogram obtained in a preceding frame $\overline{\alpha_t} - \overline{\alpha_{t-\Delta t}}$. The difference pattern is then obtained by operating the reconstruction function on the result: $dA_t = P'(\overline{\alpha_t} - \overline{\alpha_{t-\Delta t}})$. This alternative is schematically depicted in FIG. 12D.

To illustrate the errors that may occur when a sampling point is removed, consider the simplified example that an interpolation point is given as the average of two sampling points (with equal weight), represented by indices A and B. Assume that the sampling points have the following calibration values $I_0^A$, $I_0^B$ and energy values $I_t^A$, $I_t^B$ at time t: [$I_t^A=44$, $I_0^A=50$, $I_t^B=91$, $I_0^B=100$]. Such variations, both between sampling points and over time for an individual sampling point, may occur as a result of imperfections in the FTIR system. Based on these example values, the weighted average interpolation computes the value of the interpolation point AB as: $\overline{\alpha^{AB}}=0.5 (-\log(0.88)-\log(0.91))\approx 0.111$. If sampling point B is deemed corrupt and therefore eliminated, the value of the interpolation point AB is instead computed as: $\overline{\alpha^{AB}}=(-\log(0.88))\approx 0.128$. The removal of sampling point B results in a change of slightly more than 10% in the value of the interpolation point AB. This seemingly small change may be sufficient to generate artefacts in the $A_t$ or $dA_t$ that disrupt the touch determination.

Assuming instead that the processing aims at reconstructing a difference pattern between two consecutive frames, using the values: [$I_t^A=50$, $I_{t-1}^A=50$, $I_t^B=100$, $I_{t-1}^B=100$], yields $\overline{d\alpha^{AB}}=0.5\cdot(-\log(1)-\log(1))=0$ with both sampling points A, B present at time t, and $\overline{d\alpha^{AB}}=(-\log(1))=0$ if sampling point B is eliminated at time t (and not at time t−1). In this particular situation, the elimination of the sampling point does not introduce any errors in the resulting difference pattern $dA_t$.

3.2 Interpolation of Absolute Values

Figure 13A:
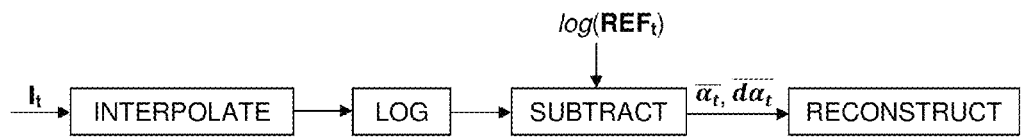
FIGS. 13A-13C illustrate different sequences of processing steps that involve an interpolation of absolute values and that result in a signal interaction pattern being generated.
Figure 13B:
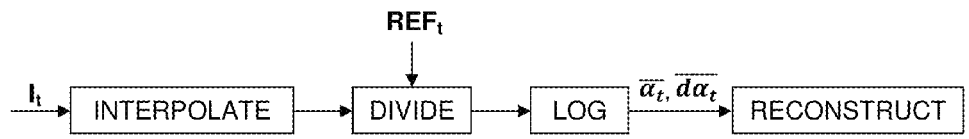
Figure 13C:
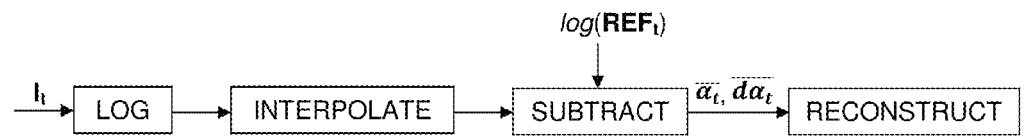

For various reasons, it may be desirable to operate the interpolation function on absolute values instead of relative values. As used herein, "absolute values" refer to non-normalized values, as a distinction to relative values, which are normalized. If the interpolation function is (approximately) linear, it is possible to convert the absolute values of the interpolation points into (approximately) correct relative values after the interpolation. One reason for operating on absolute values might be to reduce the amount of memory and/or processing power required for the interpolation. The absolute values may, e.g., be given as energy $I_t$ or logarithmic energy $\log(I_t)$. FIGS. 13A-13C illustrate different processing pipelines for generating an attenuation pattern based on the projection values $I_t$, by operating the interpolation on absolute values.

In FIGS. 13A-13B, the values of the sampling points are given as projection values $I_t$ (energy values). In FIG. 13A, the input or change values $\overline{\alpha_t}$, $\overline{d\alpha_t}$ are then generated by dividing the values of the interpolation points in the matched sinogram, generated in the interpolation, by a respective reference value and by taking the logarithm of the result. The input or change values $\overline{\alpha_t}$, $\overline{d\alpha_t}$ are then processed for reconstruction of $A_t$ or $dA_t$. In FIG. 13B, the input or change values $\overline{\alpha_t}$, $\overline{d\alpha_t}$ are generated by taking the logarithm of the values of the interpolation points in the matched sinogram, generated in the interpolation, and by subtracting the resulting values from corresponding logarithmic reference values, e.g. $\log(REF_t) - \log(I_t)$.

In FIG. 13C, the values of the sampling points are formatted as logarithmic energy $\log(I_t)$, by taking the logarithm of the respective projection value. The input values $\overline{\alpha_t}$ or change values $\overline{d\alpha_t}$ are then generated by a simple subtraction operation that subtracts the values of the interpolation points from a respective logarithmic reference value, e.g. $\log(REF_t) - \log(I_t)$.

In FIGS. 13A-13C, the normalization is performed after the interpolation, and the reference values are therefore given for the fictitious detection lines (i.e. the interpolation points).

The alternative for generating the difference pattern $dA_t$ as described above in relation to FIG. 12D is equally applicable when operating on absolute values.

The removal of sampling points may introduce large errors when absolute values are interpolated. This will now be illustrated by re-visiting the simplified numeric examples presented in Chapter 3.1. Operating on $[I_t^A, I_0^A, I_t^B, I_0^B]$ yields $\log(I_t^{AB})=0.5\cdot(\log(44)+\log(91))\approx 4.148$, and $\log(I_0^{AB})=0.5 \ (\log(50)+\log(100))\approx 4.259$ when both sampling points A, B are present, resulting in $\overline{\alpha^{AB}}=\log(I_0^{AB})-\log(I_t^{AB})\approx 0.111$. If sampling point B is eliminated, the value of the interpolation point AB is instead computed as: $\log(I_t^{AB})=\log(44)\approx 3.874$. Since $\log(I_0^{AB})=\log(50)$ f 4.259, the input value of the interpolation point is calculated to $\overline{\alpha^{AB}}\approx 0.385$. Clearly, the removal of sampling point B results in a significantly incorrect input value $\overline{\alpha^{AB}}$ of the affected interpolation point AB.

When a difference pattern is reconstructed by operating on $[I_t^A, I_{t-1}^A, I_t^B, I_{t-1}^B]$, with both sampling points A, B present at t and t-1, the value of the interpolation point AB is $\log(I_{t-1}^{AB})=0.5\cdot(\log(50)+\log(100))\approx 4.259$, and $\log(I_t^{AB})=0.5\cdot(\log(50)+\log(100))\approx 4.259$, which in turn yields $\overline{d\alpha^{AB}}=\log(I_{t-1}^{AB})-\log(I_t^{AB})=0$. Eliminating sampling point B at time t yields $\log(I_t^{AB})=\log(50)\approx 3.912$, which in turn results in $\overline{d\alpha^{AB}}=\log(I_{t-1}^{AB})-\log(I_t^{AB})\approx 0.347$. Hence, in contrast to Chapter 3.1, the differential computation produces a significantly incorrect change value $\overline{d\alpha^{AB}}$ of the interpolation point AB, since the change value $\overline{d\alpha^{AB}}$ should be zero.

Generally, interpolation of absolute values, and subsequent conversion of the interpolated absolute values into relative values for input to an image reconstruction function, as exemplified in FIGS. 13A-13C, is vulnerable to removal of sampling points, if the signal levels (absolute values) differ between the detection lines. This is typically the case in a commercially viable product, since it may be difficult/costly to produce a touch-sensitive apparatus with well-balanced detection lines. It is to be noted that even a small imbalance in signal levels may cause state changes of sampling points to result in interpolation errors that have a significant impact on the reconstructed pattern.

3.3 Detailed Example of a Process for Handling State Changes

A state change refers to an action of changing a sampling point from a valid state to an invalid state, or from an invalid state to a valid state. As seen in the foregoing, such a state change may cause an undesired disruption of the interpolated values in the matched sinogram. In various embodiments, the impact of state changes is addressed by an error correction step in the touch determination process. The error correction is responsive to data indicative of state changes for the sampling points in the current frame, this data being denoted "exclusion data" herein. Generally, the error correction operates to identify the interpolation points that are affected by the state change, and then actively modifies each affected interpolated point so as to ensure that the affected interpolation point has the same relative signal transmission as before the state change. In other words, the error correction operates to maintain the relative loss of power/energy/intensity for each fictitious detection line that is affected by the state change.

If the reconstruction function P' operates on input values $\overline{\alpha_t}$, which are given with respect to calibration values $I_0$, the error correction operates to maintain the input value from a preceding frame. It should be recalled that the input values may be regarded to represent the relative signal transmission. The error correction may be implemented in different ways depending the format of the values of the sampling points, i.e. the values that are interpolated. If the interpolation operates on absolute values, the error correction may operate to maintain the current value of the affected interpolation point and modify the calibration value of the affected interpolation point, so as to maintain the relative signal transmission. This means that the error correction treats the current interpolation values that are disrupted by the state change as correct values, and instead manipulates the calibration values that are used for generating the relative values for input to the reconstruction function. If the interpolation instead operates directly on relative values, the error correction may operate to set the current value of an affected interpolation point equal to the preceding value of the affected interpolation point.

If the reconstruction function P' operates on change values $\overline{d\alpha_t}$, which are given with respect to recently measured energy values $I_{t-\Delta t}$, $\overline{I_{t-m}}$, the error correction operates to set the change values for the affected interpolation values to zero in the frame that is affected by the state change. This may be achieved either by directly setting the change value to zero, or by setting the reference value of the affected interpolation point equal to the current value of the affected interpolation point.

In general, only a small part of all interpolation points are affected by a state change, and the remaining interpolation points contain sufficient information to allow the resulting pattern to be processed for touch determination.

It should be emphasized that the error correction is not dependent on how the state changes are identified and how the exclusion data is generated. Examples of techniques for identifying state changes are given below in Chapter 4.

The underlying principle will now be further explained with reference to the flow chart in FIG. 7, which represents an exemplifying touch determination method in a touch-sensitive apparatus, such as the above-described FTIR system. The method uses interpolation of absolute values to generate a matched sinogram.

The method involves a sequence of steps 70-76 that are repeatedly executed, typically by the signal processor 10 (FIG. 1). In the context of this description, each sequence of steps 70-76 is denoted a frame or a repetition.

Each frame starts by a data collection step 70, in which measurement values are obtained from the detectors 3 in the FTIR system, e.g. by sampling a value from each of the aforesaid projection signals. The data collection step 50 results in one projection value for each detection line. For the purpose of the following discussion, the current projection value is generally denoted $I_t$, although it is realized that there is one such value for each of k detection lines. It may be noted that the data may, but need not, be collected for all available detection lines in the FTIR system. The data collection step 50 may also include pre-processing of the measurement values, e.g. filtering for noise reduction, compensation for ambient light, etc.

In step 71, the projection values $I_t$ are processed for generation of the absolute values used in the subsequent interpolation step 72, specifically logarithmic values $\log(I_t)$, cf. FIG. 13C. As used herein, a "logarithm" is intended to also encompass functions approximating a true logarithmic function, in any base. In a variant, step 71 is omitted and the projection values $I_t$ obtained in step 70 are used in the interpolation step 72, cf. FIGS. 13A-13B. Irrespective of implementation, the absolute values form a sinogram g.

In interpolation step 72, a matched sinogram g' is generated by interpolation of the absolute values in the sinogram g, e.g. according to any of the techniques described in Chapter 2. In the illustrated example, step 72 accesses the exclusion data, from computer memory M (as shown) or directly from a validation process, to identify state changes. Based on the state changes, step 72 operates to remove and add sampling points, respectively, before the interpolation. Depending on interpolation function, the state changes may also cause step 72 to modify the interpolation function. As an example, FIG. 9A shows a 2D interpolation function based on Delaunay triangulation for a complete set of sampling points. If the sampling point indicated by a square in FIG. 9A is deemed invalid and removed, the 2D interpolation function may need to be updated or recomputed based on the remaining sampling points. As shown in FIG. 9B, this results in a local change of the triangles closest to the removed sampling point.

In correction step 73, the exclusion data is processed to identify all interpolation points that are affected by the respective state change. Step 73 also obtains current reference values $REF_t$ of the interpolation points (which thus form a "reference sinogram"), or at least the reference values of the affected interpolation points. As explained in Chapter 2, the reference values may take different forms, depending on the desired properties of the reconstructed pattern. For example, the current reference values $REF_t$ may be given as interpolated calibration values $\log(I_0)$, values of the interpolation points computed in a preceding frame $\log(I_{t-\Delta t})$ or averages of values of interpolation points computed in a number of preceding frames $\log(\overline{I_{t-m}})$. The reference values of the affected interpolation points are then actively modified to maintain the relative signal transmission of the affected interpolation points, e.g. as discussed in the foregoing. The ensemble of reference values $REF'_t$ after modification form a "modified reference sinogram".

Step 73 is followed by a conversion step 74 which uses the modified reference sinogram $REF'_t$ to generate the relative values for input to the reconstruction step 75, i.e. interpolated input values $\overline{\alpha_t}$ or change values $\overline{d\alpha_t}$, depending on implementation.

Reverting to the processing pipelines in FIGS. 13A-13C, the conversion step 74 corresponds to the processing steps that are preformed between the interpolation and the reconstruction, if $REF_t$ is replaced by $REF'_t$.

If step 74 is designed to generate change values $\overline{d\alpha_t}$, step 72 may be modified to omit the sub-step of generating the modified reference sinogram, and step 74 may instead be designed to modify the change values $\overline{d\alpha_t}$ that are supplied to the reconstruction process by setting $\overline{d\alpha_t}=0$ for all affected interpolation points.

Figure 8A:
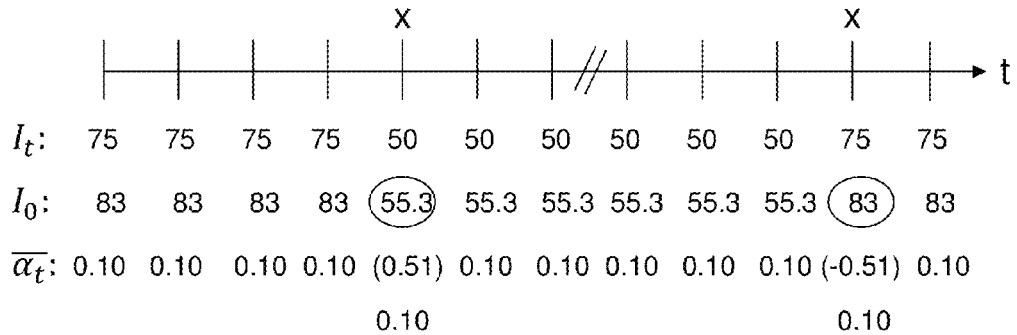
FIGS. 8A-8C are time-sequences of projection values, reference values and resulting relative values to exemplify the inventive handling of corrupt sampling points when the reference values are long-term values, given by the immediately preceding frame, and given two frames back in time, respectively.
Figure 8B:
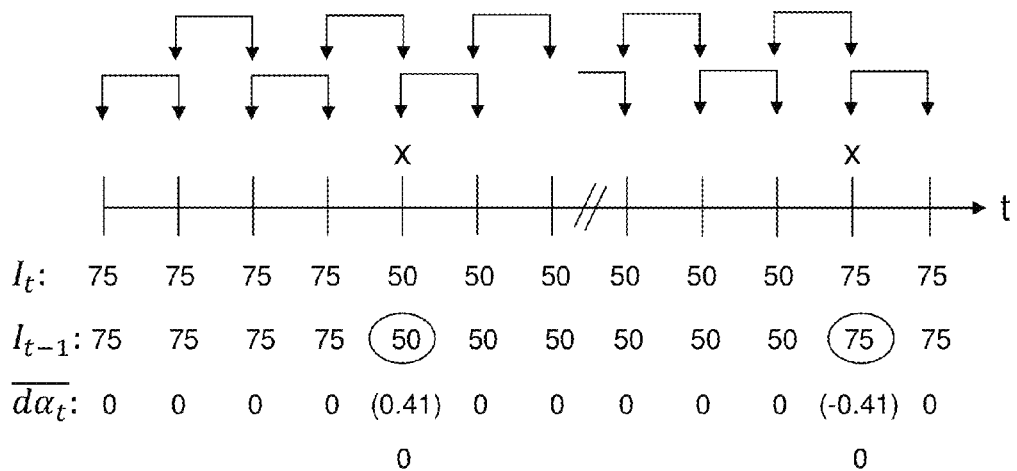
Figure 8C:
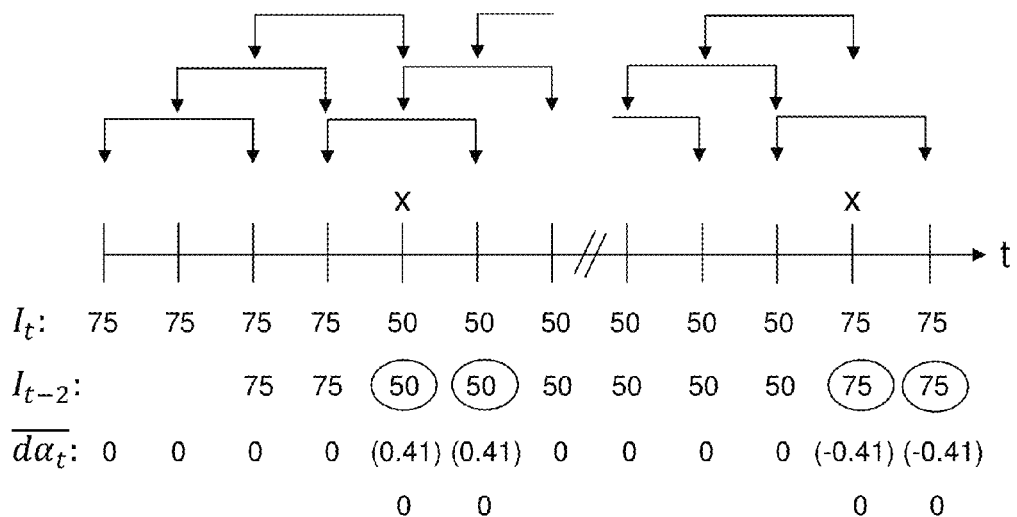

Steps 73-74 will be further explained with reference to FIGS. 8A-8C for different choices of reference values. FIGS. 8A-8C illustrate, at a sequence of time steps (frames) and for a specific fictitious detection line, current interpolation values $I_t$, current (interpolated) reference values ($I_t$, $I_{t-1}$ and $I_{t-2}$, respectively), as well current input values $\overline{\alpha_t}$ and change values $\overline{d\alpha_t}$, as applicable, which are computed from the current interpolation values and the current reference values. A state change is indicated by "X", and the modified reference values that are generated by the error correction as a result of the state change are indicated by circles. The uncorrected input and change values are shown within parenthesis, and each corrected input and change value is reproduced below the corresponding uncorrected input or change value. It should be noted that there is no change in signal interaction during the illustrated time period, i.e. the input values $\overline{\alpha_t}$ should not change over time and change values $\overline{d\alpha_t}$ should be zero.

FIG. 8A represents a process that operates on projection values to generate interpolated input values $\overline{\alpha_t}$ that represent the relative signal transmission of the fictitious detection lines. As seen, a first state change results in $I_t=50$, which yields $\overline{\alpha_t}=-\log(I_t/I_0)\approx 0.51$. To counteract this disruption, the calibration value $I_0$ is modified to 55.3, so that the relative change is the same as in the immediately preceding frame. It is to be noted that a true touch affecting $I_t$ in the next frame would be seen in the input value $\overline{\alpha_t}$, and thus the touch determination process is largely unaffected by the state change. A second state change results in $I_t=75$, whereby the error correction sets the calibration value $I_0$ to 83 to maintain the relative signal transmission.

FIG. 8B represents a process that operates on projection values to generate interpolated change values $\overline{d\alpha_t}$ that represent the change in relative signal transmission from the immediately preceding frame, as indicated by the double ended arrows: $\overline{d\alpha_t}=\overline{\alpha_t}-\overline{\alpha_{t-1}}$. In the illustrated example, the interpolated change values may be calculated with respect to the preceding interpolation values: $\overline{d\alpha_t}=\log(I_{t-1})-\log(I_t)$. As seen, a first state change results in $I_t=50$, which yields $\overline{d\alpha_t}\approx 0.41$. To counteract this disruption, the error correction operates to set the change in relative signal transmission to zero, either by directly setting $\overline{d\alpha_t}=0$, or by setting $I_{t-1}=I_t=50$. It is to be noted that a true touch affecting $I_t$ in the next frame will be seen in the change value $\overline{d\alpha_t}$, and thus the touch determination process is largely unaffected by the state change. A second state change results in $I_t=75$, whereby the error correction again ensures that $\overline{d\alpha_t}=0$.

FIG. 8C represents a process that operates on projection values to generate interpolated change values $\overline{d\alpha_t}$ that represent the change in relative signal transmission from two frames back in time, as indicated by the double ended arrows: $\overline{d\alpha_t}=\overline{\alpha_t}-\overline{\alpha_{t-2}}$. The interpolated change values are calculated with respect to the preceding interpolation values: $\overline{d\alpha_t}=\log(I_{t-2})-\log(I_t)$. As seen, a first state change results in $I_t=50$, which yields $\overline{d\alpha_t}\approx 0.41$. To counteract this disruption, the error correction operates to modify the reference value by setting $I_{t-2}=I_t=50$, so that the change in relative signal transmission is zero. Since the change in relative signal transmission is given with respect to interpolation values two frames back in time, the error correction may also operate to set the reference value for the next frame equal to the projection value of the current frame. This ensures that a touch will show up in $\overline{d\alpha_t}$ even if it occurs in the next frame that follows after a state change. In an alternative implementation, the error correction operates to set the reference value for the next frame equal to the projection value for the next frame, which will cause a touch to show up in $\overline{d\alpha_t}$ two frames after the state change. In a further alternative implementation, the error correction does not operate to modify the reference values, but instead directly sets $\overline{d\alpha_t}=0$ for two frames: the current frame and the next frame.

FIG. 8C may also serve to illustrate the process that operates on projection values to generate interpolated change values with respect to averages of preceding interpolation values: $\overline{d\alpha_t}=\log(\overline{I_{t-m}})-\log(I_t)$. Consider the example that $\overline{I_{t-m}}$ represents current averages of the interpolation values at four frames back in time, generated by an exponential forget function: $\overline{I_{t-4}}=\overline{I_{t-5}}-\epsilon\cdot(I_{t-m}-\overline{I_{t-5}})$. To counteract a state change at time t, the error correction may operate to set $\overline{I_{t-4}}=\overline{I_{t-3}}=\overline{I_{t-2}}=\overline{I_{t-1}}=I_t$ for the affected interpolation point. In an equivalent implementation, the error correction sets $\overline{I_{t-4}}=I_t$ in the current frame and then sets $\epsilon=0$ during the next three frames. Either implementation ensures that a touch will show up in $\overline{d\alpha_t}$ even if it occurs in the next frame that follows after the state change.

Figure 7:
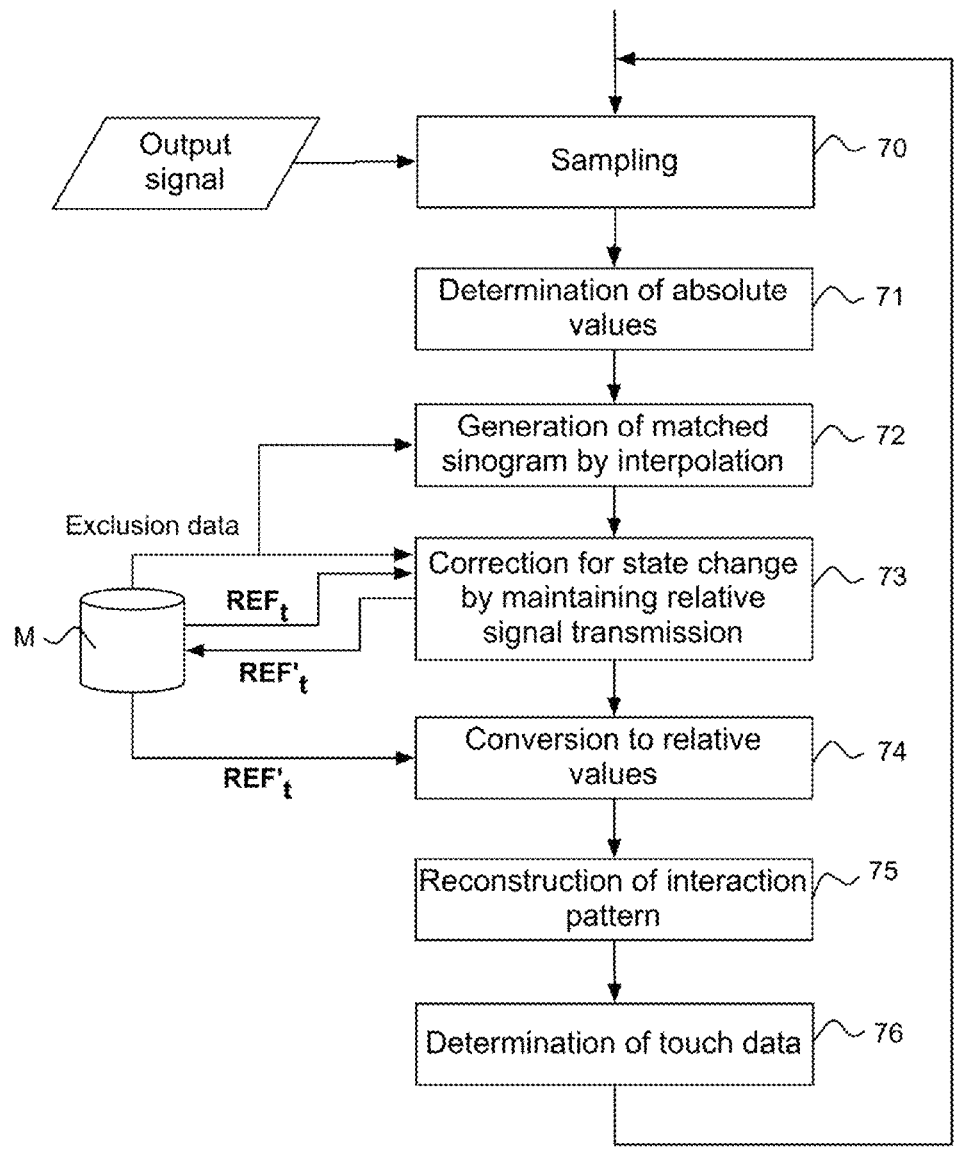
FIG. 7 is a flow chart of a touch determination method with an interpolation that handles occurrence of corrupt sampling points.

Reverting to FIG. 7, step 74 is followed by the reconstruction step 75 which operates an image reconstruction function on the interpolated input values $\overline{\alpha_t}$ or $\overline{d\alpha_t}$ to generate a current interaction pattern, e.g. an attenuation pattern $A_t$ or a difference pattern $dA_t$, e.g. to any of the techniques described in Chapter 2.

In a subsequent determination step 76, the interaction pattern is processed for identification of touch-related features and extraction of touch data. Any known technique may be used for isolating touches within the interaction pattern. For example, ordinary blob detection and tracking techniques may be used for finding the touches. In one embodiment, a threshold is first applied to the interaction pattern, to remove noise. Any areas with interaction values that fall below or above (depending on implementation) the threshold may be further processed to find the center and shape by fitting for instance a two-dimensional second-order polynomial or a Gaussian bell shape to the attenuation values, or by finding the ellipse of inertia of the attenuation values. There are also numerous other techniques as is well known in the art, such as clustering algorithms, edge detection algorithms, etc. Step 76 may be concluded by outputting the extracted touch data.

After step 76, the process returns to the data collection step 70.

It is to be understood that one or more of steps 70-76 may be effected concurrently. For example, the data collection step 70 of a subsequent frame may be initiated concurrently with any one of steps 71-75. In another example, steps 70-74, and possibly also step 75, may be repeated sequentially for each projection value in the output signal within a frame.

It is also to be understood that certain steps may be combined or intermixed. For example, instead of first generating a matched sinogram by interpolation (step 72) and then correcting certain interpolation values in the matched sinogram (step 73) based on the exclusion data, the error correction may be implemented as part of the interpolation in step 72, such that the interpolation directly generates a matched sinogram with corrected interpolation values.

The skilled person now realizes that the touch determination process in FIG. 7 may be modified to operate the interpolation step 72 on relative values, e.g. as shown in FIGS. 12A-12C. For example, step 71 may be modified to generate relative values, e.g. input values $\overline{\alpha_t}$ or change values $\overline{d\alpha_t}$, or alternatively $I_t/REF_t$, based on the projection values $I_t$ and corresponding reference values $REF_t$, e.g. represented by any of $I_0$, $I_{t-\Delta t}$ and $\overline{I_{t-m}}$. In contrast to the above-described example, the reference values are given for the sampling points (not the interpolation points). Further, step 73 is modified to, for all affected interpolation points, set the current relative value equal to the relative value in a preceding frame or set the current relative value to zero, in analogy with FIGS. 8A-8C. Still further, step 74 may be omitted if the interpolation values are given as $\overline{\alpha_t}$ or $\overline{d\alpha_t}$, cf. FIGS. 12A-12B. If the interpolation values are given as $I_t/REF_t$, step 74 may be modified to convert the interpolation values into $\overline{\alpha_t}$ or $\overline{d\alpha_t}$, cf. FIG. 12C.

In all embodiments disclosed herein, to increase the robustness of the error correction, it is conceivable to let a state change not only affect a current frame but also a given number of subsequent frames. For example, every state change in the exclusion data may cause step 73 to perform the error correction for a given number of consecutive frames, e.g. 2-3 frames, in which the relative signal transmission is maintained according to the principles described in the foregoing.

4. Detecting Invalid Detection Lines

The above-mentioned error handling for validation of detection lines may be implemented to detect potentially faulty detection lines by processing the projection signals, e.g. by detecting if the projection values exceed a saturation limit, if the projection values are too weak, if the noise level in the projection signal is too high, if the signal-to-noise level in the projection signal is too low, etc. Alternatively, the validation process may detect a faulty emitter or detector based on the power signal supplied to the emitter/detector. It is also conceivable that the validation process designates all affected detection lines as "invalid" for a given number of frames whenever an operating parameter of an emitter or a detector is changed, so as to prevent that the change in operating parameter introduces errors in the touch determination. Such an operating parameter may be the power supplied to the emitter or the gain of the detector. The power to the emitter may be changed to increase/decrease the energy of the light that is emitted when the emitter is active, and the gain of the detector may be changed to increase/decrease the sensitivity of the detector.

Further examples of validation processes are given in WO2011/078769, WO2011/139213 and WO2012/158105.

Embodiments of an alternative or supplement to the above-mentioned validation processes are described in the following. These embodiments utilize the energy values measured by the detectors 3 while the emitters 2 are OFF, i.e. not activated to emit a signal (light). In the following, an "ON value" denotes detected energy when a signal is conducted from the incoupling point to the outcoupling point of a detection line, and an "OFF value" denotes detected energy without a signal being conducted from the incoupling point to the outcoupling point.

The OFF values are conventionally used for so-called ambient compensation, which aims at removing or at least suppressing signal components originating from ambient light and detector dark level, including any analog-to-digital conversion (ADC) offset. Ambient light refers to light that is received by a detector while not originating from the emitters. The ON/OFF activation scheme of the emitters may enable each detector to measure an OFF value one or several times during a frame. An ambient-compensated energy value $I_k$ for detection line k may then be obtained as: $I_k=I_{raw,k}-I_{amb,k}$, where $I_{raw,k}$ is the ON value or an average of ON values, i.e. the energy measured by the detector associated with detection line k when the emitter associated with detection line k is ON, and $I_{amb,k}$ is the OFF value or an average of OFF values, i.e. the energy measured by the detector associated with detection line k when all emitters are OFF. It is to be understood that the touch determination method may operate on $I_k$ instead of $I_{raw,k}$ to improve its robustness to ambient light.

In the various embodiments, the OFF values, obtained during one or plural frames, are processed to generate a current estimate of the noise level for each individual detector, and hence for each detection line. By using the ambient measurements for validation, all influence from touching objects on the estimated noise level is avoided. Furthermore, the validation process may be designed to operate on the same data as the ambient compensation.

FIG. 10 is a flowchart of an exemplifying validation process, which involves a sequence of steps 120-124 that are executed during a frame, e.g. by the signal processor 10 (FIG. 1). The validation process is illustrated for a single detector, but it is understood that a similar process is executed for each detector in the touch-sensitive apparatus.

In step 120, one or more ON values are obtained from the detector. In step 121, one or more OFF values are obtained from the detector. As indicated by the dashed arrow, steps 120 and 121 may be repeated one or more times during a frame, depending on implementation. It is also conceivable that step 121 is performed before step 120, or that step 121 is performed both before and after step 120. In step 122, an ambient-compensated ON value is computed, e.g. as described above. In step 123, a noise estimate is computed based on OFF values obtained in the current frame, and possibly in one or more preceding frames. In step 124, the detector and/or its detection lines are validated based on the noise estimate. Any detection lines that do not pass the validation may be indicated an "invalid" in the exclusion data, while other detection lines may be indicated as "valid". The exclusion data may be stored in computer memory M for retrieval by the correction step 73 (FIG. 7) in the same or in a forthcoming frame. Alternatively, the exclusion data may be directly supplied to step 73.

Step 123 may compute the noise estimate as a standard deviation or variance of the OFF values. It is conceivable that only a subset of the OFF values measured by the detector is included in the noise estimation. For example, OFF values that are measured after ON values that are saturated to such an extent that the OFF value is likely to contain a residual signal caused by the preceding saturation, may be omitted from the noise estimation. Such OFF values may also be omitted from the ambient compensation in step 122.

In one embodiment, the noise estimate is continuously updated using the N latest OFF values. In another embodiment, the noise estimate is given by an exponential forget estimation of the variance (standard deviation) of the OFF values.

Any known algorithm for computing variance or standard deviation may be used. In certain implementations, it may be advantageous to use an online algorithm. An example of such an algorithm, which allows variance to be computed "on the fly" using two accumulators, is:

$$\widetilde{I_{noise}} = \frac{\Sigma(I_{amb,n})^2 - (\Sigma I_{amb,n})^2 / N}{N},$$

where $I_{amb,n}$ is the n:th OFF value for a detector, and N is the total number of OFF values used for computation of variance.

A different approach may be used if there are strong low-frequency noise components present in the signals, e.g. influence of residential lighting at a frequency of 100 Hz. Depending on the ON/OFF activation scheme of the touch-sensitive apparatus, such noise components may produce high values of variance (or standard deviation), unless care is taken. This may be avoided, e.g., by estimating the noise level based on the absolute difference between consecutive OFF values for each detector. e.g. $\widetilde{I_{noise}} = \Sigma |\Delta I_{amb,n}|/N$, or $\widetilde{I_{noise}} = \sqrt{\Sigma(\Delta I_{amb,n})^2}/N$.

The validation step 124 may apply any one of several different validation criteria, or a combination thereof.

One validation criterion stipulates that a valid detection line must fulfill: $(I_{raw,k} < I_{saturation})$ and $(I_k > T_{CNR} \cdot \widetilde{I_{noise}})$, where $I_{saturation}$ is a saturation limit (global or for each detector) and $T_{CNR}$ is a carrier-to-noise (CNR) limit. This criterion ensures that saturated detection lines are excluded from further processing, and that only detection lines with a sufficient CNR is used in the touch determination process. The CNR limit is given by the magnitude of attenuation changes that needs to be detected. In one implementation, the CNR limit is set in the range of about 100-300. It is understood that a lower or higher CNR limit may be used. It should also be noted that saturation is evaluated for the ON value without ambient compensation, while CNR is evaluated for the ambient-compensated ON value.

Another validation criterion stipulates that the noise estimate should not exceed a maximum noise limit to be deemed valid: $\widetilde{I_{noise}} < T_{noise}$. This criterion, in contrast to the CNR criterion, identifies all of the detector's detection lines as invalid, even if one or more detection lines have a high ON value.

Another validation criterion stipulates that detection lines with $\widetilde{I_{noise}} \approx 0$ are deemed invalid. Almost zero noise may indicate that the detector is faulty or that the received energy is too low.

Another validation criterion stipulates that the ambient-compensated ON value should exceed a minimum signal limit to be deemed valid: $I_k > I_{min}$. Such a validation criterion may even replace the use of the noise estimate if the touch-sensitive apparatus is known to exhibit low noise levels.

It is to be understood that the above validation limits $I_{saturation}$, $T_{CNR}$, $T_{noise}$, $I_{min}$ may be set individually for each detector and/or detection line.

If the evaluation parameter is close to the validation limit, the validation process may cause frequent state changes, which in turn may disturb the touch determination process. In one embodiment, one or more hysteresis windows are used in the validation step to ameliorate this problem. This means that one or more of the validation criteria has a first limit value for invalidation and a second limit value for validation. Suitably, the first and second limit values are set to promote invalidation over validation, i.e. making it harder for an invalid sampling point to be deemed valid than for a valid sampling point to be deemed invalid. The skilled person realizes that there are many equivalent techniques to promote invalidation over validation.

It is to be understood that the validation process may be generally combined with any touch determination process that is designed to be responsive to exclusion data. Thus, the validation process may be seen as a method for processing an output signal from a touch-sensitive apparatus, which comprises a plurality of signal generators and a plurality of signal detectors that are operable to define actual detection lines that extend across a surface portion of a panel, and a controller operable to repeatedly turn the signal generators ON and OFF such that the output signal of the signal generators comprise ON energy values for the actual detection lines and OFF energy values for each signal detector. The method comprises the steps of: obtaining the OFF energy values from the output signal; generating a noise estimate for each actual detection line as a function of the OFF energy values; and validating the actual detection lines based on the noise estimate.

5. Hardware Implementations

The touch determination process and the validation process according to the various embodiments disclosed herein may be implemented by a data processing device (cf. 10 in FIG. 1) which is connected to sample measurement values from the detectors 3 in the FTIR system. FIG. 11A shows an example of a data processing device 10 configured to implement the process in FIG. 7. The device 10 includes an input 10A for receiving the output signal. The device 10 further includes a data collection element (or means) 200 for obtaining the current projection values, a generation element (or means) 201 for generating absolute values, an interpolation element (or means) 202 for generating a matched sinogram with absolute values, an error correction element 203 for maintaining the relative signal transmission of affected interpolation points, a conversion element (or means) 204 for converting the absolute values of the interpolation points into relative values, a reconstruction element (or means) 205 for generating a current interaction pattern, and an output 10B for outputting the current interaction pattern. In the example of FIG. 11A, the actual extraction of touch data is carried out by a separate device 10' which is connected to receive the interaction pattern from the data processing device 10. FIG. 11B shows an example of a data processing device 10 configured to implement the process in FIG. 10. The device 10 includes an input 10B for receiving the output signal. The device 10 further includes an element (or means) 210 for obtaining the ON values, an element (or means) 211 for obtaining the OFF values, a compensation element (or means) 212 for generating ambient-compensated ON values, a noise estimation element (or means) 213 for computing a noise estimate based on OFF values, and a validation element 214 for validating the detection lines and generating the exclusion data for storage in memory M.

The device 10 may be implemented by special-purpose software (or firmware) run on one or more general-purpose or special-purpose computing devices. In this context, it is to be understood that each "element" or "means" of such a computing device refers to a conceptual equivalent of a method step; there is not always a one-to-one correspondence between elements/means and particular pieces of hardware or software routines. One piece of hardware sometimes comprises different means/elements. For example, a processing unit may serve as one element/means when executing one instruction, but serve as another element/means when executing another instruction. In addition, one element/means may be implemented by one instruction in some cases, but by a plurality of instructions in some other cases. Naturally, it is conceivable that one or more elements (means) are implemented entirely by analog hardware components.

The software controlled device 10 may include one or more processing units (cf. 14 in FIG. 1), e.g. a CPU ("Central Processing Unit"), a DSP ("Digital Signal Processor"), an ASIC ("Application-Specific Integrated Circuit"), discrete analog and/or digital components, or some other programmable logical device, such as an FPGA ("Field Programmable Gate Array"). The device 10 may further include a system memory and a system bus that couples various system components including the system memory to the processing unit. The system bus may be any of several types of bus structures including a memory bus or memory controller, a peripheral bus, and a local bus using any of a variety of bus architectures. The system memory may include computer storage media in the form of volatile and/or non-volatile memory such as read only memory (ROM), random access memory (RAM) and flash memory. The special-purpose software, the exclusion data, the reference values, and any other data needed during execution, may be stored in the system memory, or on other removable/non-removable volatile/non-volatile computer storage media which is included in or accessible to the computing device, such as magnetic media, optical media, flash memory cards, digital tape, solid state RAM, solid state ROM, etc. The data processing device 10 may include one or more communication interfaces, such as a serial interface, a parallel interface, a USB interface, a wireless interface, a network adapter, etc. as well as one or more data acquisition devices, such as an A/D converter. The special-purpose software may be provided to the device 10 on any suitable computer-readable medium, including a record medium, and a read-only memory.

While the invention has been described in connection with what is presently considered to be the most practical and preferred embodiments, it is to be understood that the invention is not to be limited to the disclosed embodiments, but on the contrary, is intended to cover various modifications and equivalent arrangements included within the spirit and the scope of the appended claims.

For example, the reconstructed pattern need not strictly represent attenuation, but could be generated in any format that enables detection of interaction on the touch surface. Thus, the reconstructed pattern may represent local attenuation or local transmission in a broad sense and may be generally referred to as an "signal interaction pattern". With respect to the specific formats of input values $\overline{\Delta}_t$ and change values $\overline{d\alpha}_t$ used in the foregoing examples, modifications may be made, e.g., to sign, scaling or offset, without impeding the ability for touch determination.

The invention claimed is:

1. A method of enabling touch determination based on an output signal from a touch-sensitive apparatus, the touch-sensitive apparatus including a panel, a plurality of peripheral light emitters and a plurality of peripheral light detectors, the plurality of peripheral light emitters configured to transmit light signals to the plurality of peripheral light detectors, the transmitted light signals defining actual detection lines across a surface portion of the panel between pairs of light emitters and light detectors, the touch-sensitive apparatus further including at least one signal generator coupled to the plurality of peripheral light emitters to generate the light signals, wherein the plurality of peripheral light detectors are configured to generate the output signal, the method operating in a sequence of repetitions, each repetition comprising:

processing the output signal to generate a set of data samples, each data sample representing detected energy for one of the actual detection lines;

generating an interpolated sinogram based on the set of data samples, the interpolated sinogram including interpolation samples representing fictitious detection lines having a desired location on the surface portion of the panel;
operating an image reconstruction function on the interpolated sinogram to generate a signal interaction pattern within at least part of the surface portion of the panel;
performing error correction in response to exclusion data identifying a change in validity status for a data sample, from among the set of data samples, in a current repetition;
wherein said error correction includes
identifying interpolation samples affected by the change in validity status, and
setting each identified interpolation sample to a value that maintains a relative signal transmission of the fictitious detection line from a former repetition.

2. The method of claim 1, wherein the interpolated sinogram represents relative values between energy values and reference energy values for the fictitious detection lines.

3. The method of claim 2, wherein the generating an interpolated sinogram comprises:
operating an interpolation function on the data samples to generate the energy values for the fictitious detection lines; and
converting the energy values to the relative values based on the reference energy values for the fictitious detection lines.

4. The method of claim 2, wherein
the reference energy values for the fictitious detection lines are generated by operating an interpolation function on data samples obtained from the output signal in a calibration step without objects in contact with the surface portion of the panel; and
the error correction includes manipulating the reference energy value of each identified interpolation sample to maintain the relative signal transmission of the corresponding fictitious detection line from the former repetition.

5. The method of claim 2, further comprising:
updating the reference energy values to represent the energy values in a preceding repetition, such that the relative values represent a change in the relative signal transmission between the current and the former repetition for each fictitious detection line.

6. The method of claim 5, wherein the reference energy values are updated in each repetition.

7. The method of claim 5, wherein the error correction further comprises:
setting the relative value of each identified interpolation sample to zero.

8. The method of claim 5, wherein the error correction further comprises:
setting, for each identified interpolation sample, the reference energy value of the former repetition equal to the energy value of the current repetition.

9. The method of claim 8, wherein the former repetition is separated from the current repetition by a number of intermediate repetitions.

10. The method of claim 9, wherein the error correction further comprises:
setting the reference energy values for the number of intermediate repetitions equal to the energy value of the current repetition.

11. The method of claim 1, further comprising:
turning the at least one signal generator ON and OFF during each repetition, such that the output signal is generated to include ON energy values for the actual detection lines and at least one OFF energy value for each of the plurality of peripheral light detectors;
performing a validation process to designate an actual detection line as valid or invalid, and to generate the exclusion data, the validation process including
obtaining the OFF energy values from the output signal,
generating a noise estimate for each actual detection line as a function of the OFF energy values, and
validating the actual detection lines based on the noise estimate.

12. The method of claim 11, wherein the generated noise estimate represents a variability in a time sequence of OFF energy values for the peripheral light detector associated with the actual detection line.

13. The method of claim 11, wherein an actual detection line is designated as invalid if the noise estimate exceeds a noise limit.

14. The method of claim 11, wherein an actual detection line is designated as invalid if the ON energy value of the actual detection line exceeds a saturation limit.

15. The method of claim 11, wherein the processing the output signal to generate the set of data samples comprises:
obtaining the ON energy values from the output signal;
obtaining an estimated ambient value for each actual detection line based on the at least one OFF energy value for the peripheral light detector associated with the actual detection line; and
generating an ambient-compensated energy value by subtracting the estimated ambient value from the ON energy value for each actual detection line.

16. The method of claim 15, wherein an actual detection line is designated as invalid if the ratio between the ambient-compensated energy value and the noise estimate is less than a threshold minimum ratio.

17. The method of claim 15, wherein an actual detection line is designated as invalid if the ambient-compensated energy value is less than a threshold minimum energy.

18. The method of claim 11, wherein the validation process is configured to promote a change of designation from valid to invalid over a change of designation from invalid to valid.

19. A device for enabling touch determination based on an output signal from a touch-sensitive apparatus, the touch-sensitive apparatus including a panel, a plurality of peripheral light emitters, and a plurality of peripheral light detectors, the plurality of peripheral light emitters configured to transmit light signals to the plurality of peripheral light detectors, the transmitted light signals defining actual detection lines that extend across a surface portion of the panel between pairs of light emitters and light detectors, the touch sensitive apparatus further including at least one signal generator coupled to the plurality of peripheral light emitters to generate the light signals, and the plurality of peripheral light detectors configured to generate the output signal, wherein the device is configured to execute a sequence of repetitions, and the device comprises:
means for processing, in each repetition, the output signal to generate a set of data samples, each data sample representing detected energy for one of the actual detection lines;
means for generating, in each repetition, an interpolated sinogram based on the set of data samples, the interpolated sinogram including interpolation samples representing fictitious detection lines having a desired location on the surface portion of the panel;

means for operating, in each repetition, an image reconstruction function on the interpolated sinogram to generate a signal interaction pattern within at least part of the surface portion of the panel; and means for performing error correction in response to exclusion data identifying a change in validity status for a data sample, from among the set of data samples, in a current repetition;

wherein said means for performing error correction includes means for identifying interpolation samples affected by the change in validity status, and means for setting each identified interpolation sample to a value that maintains a relative signal transmission of the fictitious detection line from a former repetition.

20. A touch-sensitive apparatus, comprising:
the device for enabling touch determination according to claim 19; and
the panel having the plurality of peripheral light emitters and the plurality of peripheral light detectors arranged around the periphery of the panel.

21. A device for enabling touch determination based on an output signal from a touch-sensitive apparatus, the touch-sensitive apparatus including a panel, a plurality of peripheral light emitters, and a plurality of peripheral light detectors, the plurality of peripheral light emitters configured to transmit light signals to the plurality of peripheral light detectors, the transmitted light signals defining actual detection lines that extend across a surface portion of the panel between pairs of light emitters and light detectors, the touch sensitive apparatus further including at least one signal generator coupled to the plurality of peripheral light emitters to generate the light signals, and the plurality of peripheral light detectors configured to generate the output signal, the device comprising:

one or more processors configured to execute computer readable instructions to process the output signal to generate a set of data samples, each data sample representing detected energy for one of the actual detection lines;

generate an interpolated sinogram based on the set of data samples, the interpolated sinogram including interpolation samples representing fictitious detection lines having a location on the surface portion of the panel;

operate an image reconstruction function on the interpolated sinogram to generate a signal interaction pattern within at least part of the surface portion of the panel; and perform error correction in response to exclusion data identifying a change in validity status for a data sample, from among the set of data samples, in a current repetition among a sequence of repetitions;

wherein said error correction includes identifying interpolation samples affected by the change in validity status, and setting each identified interpolation sample to a value that maintains a relative signal transmission of the fictitious detection line from a former repetition among the sequence of repetitions.

* * * * *